(12) United States Patent
Tamba et al.

(10) Patent No.: US 8,052,577 B2
(45) Date of Patent: Nov. 8, 2011

(54) TORQUE CONVERTER

(75) Inventors: Richard Terrence Tamba, Castle Hill (AU); Darren Lee Firth, West Pennant Hills (AU)

(73) Assignee: NT Consulting International PTY LTD, Castle Hill (AU)

( * ) Notice: Subject to any disclaimer, the term of this patent is extended or adjusted under 35 U.S.C. 154(b) by 653 days.

(21) Appl. No.: 11/573,991

(22) PCT Filed: Aug. 18, 2005

(86) PCT No.: PCT/AU2005/001242
§ 371 (c)(1),
(2), (4) Date: Nov. 10, 2008

(87) PCT Pub. No.: WO2006/017902
PCT Pub. Date: Feb. 23, 2006

(65) Prior Publication Data
US 2009/0054206 A1 Feb. 26, 2009

(30) Foreign Application Priority Data
Aug. 20, 2004 (AU) .............................. 2004904779

(51) Int. Cl.
*F16H 61/14* (2006.01)
(52) U.S. Cl. ........................................ 477/168; 477/180
(58) Field of Classification Search ............... 477/168
See application file for complete search history.

(56) References Cited

U.S. PATENT DOCUMENTS

| 5,145,045 | A | 9/1992 | Wakahara |
| 5,755,638 | A | 5/1998 | Suzuki |
| 5,947,865 | A | 9/1999 | Watanabe et al. |
| 6,139,472 | A | 10/2000 | Harada et al. |
| 6,296,019 | B1 | 10/2001 | Muller et al. |
| 2001/0004621 | A1* | 6/2001 | Suzuki et al. ................. 477/168 |
| 2001/0056004 | A1 | 12/2001 | Kim et al. |
| 2003/0195084 | A1* | 10/2003 | Tabata .......................... 477/168 |

FOREIGN PATENT DOCUMENTS

| EP | 0 452 887 A2 | 10/1991 |
| EP | 0 814 285 A2 | 12/1997 |
| GB | 2 153 459 A | 8/1985 |
| JP | 8-21525 A | 1/1996 |
| JP | 2004-138148 A | 5/2004 |
| JP | 2004-232870 A | 8/2004 |

* cited by examiner

*Primary Examiner* — Edwin A Young
(74) *Attorney, Agent, or Firm* — Fitch, Even, Tabin & Flannery

(57) ABSTRACT

A torque converter having a lockup clutch or a coupling device, for selectively providing a mechanical connection between a drive unit and a drive train. The lockup clutch (C) or coupling device has a driving part connected to the drive unit and a driven part connected to the drive train. The torque converter also has a control system for applying a first pressure in a sense to cause frictional engagement between the driving part and the driven part and a second pressure in a sense to cause disengagement of the driving part and the driven part. A differential between the pressures is progressively controllable by the control system so as to control the relative positioning between the driven part and the driving part.

20 Claims, 18 Drawing Sheets

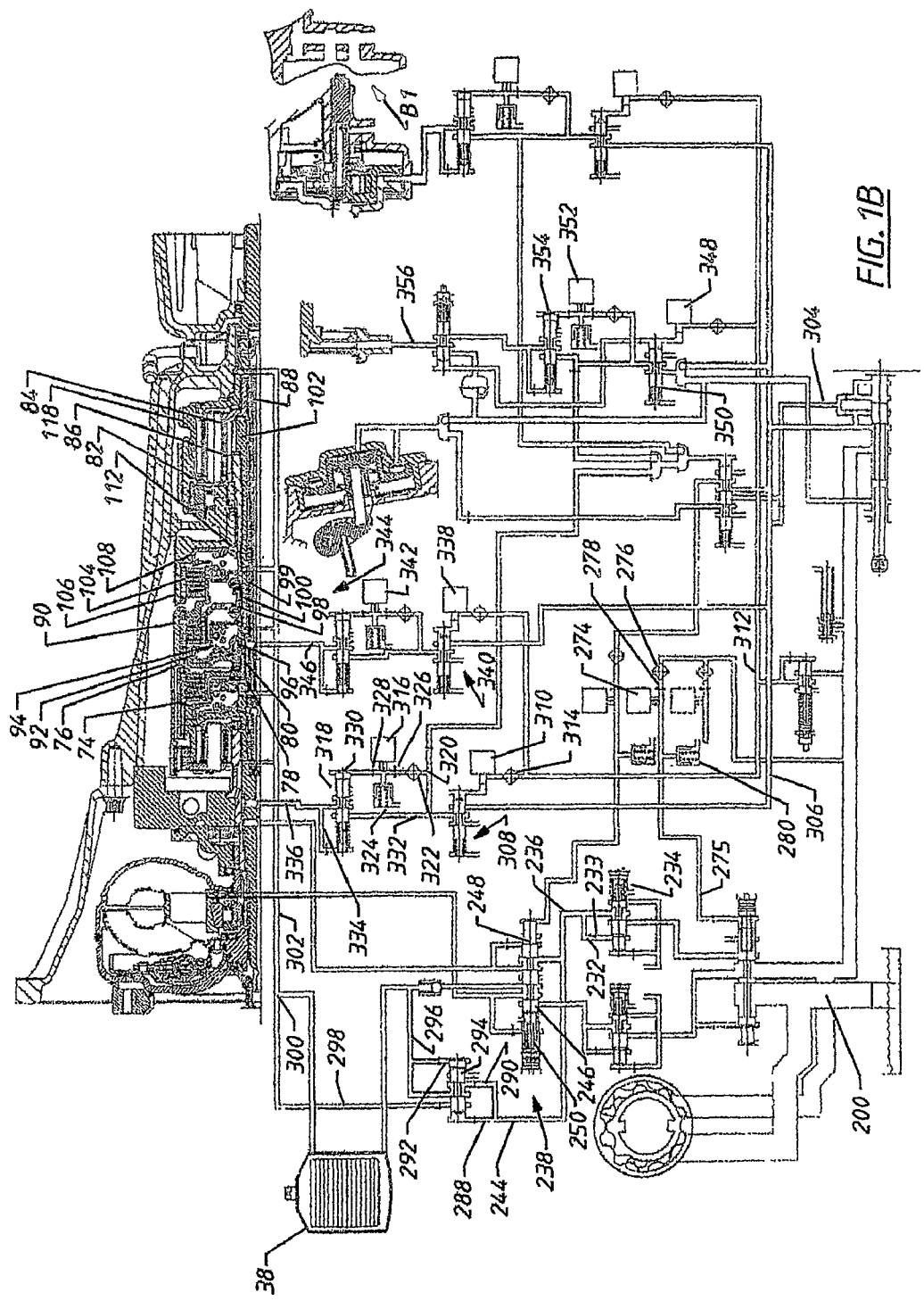

SHIFT ELEMENT CHART

| GEAR | GEAR | C1 | C2 | C3 | 1-2 SPRAG | B1 | B2 |
|------|------|----|----|----|-----------|----|----|
| M1   | 3.53 |    | X  |    |           |    | X  |
| 1    | 3.53 |    | X  |    | X         |    |    |
| 2    | 2.14 |    | X  |    |           | X  |    |
| 3    | 1.48 | X  | X  | X  |           |    |    |
| 4    | 1.16 | X  |    |    |           |    |    |
| 5    | 0.87 | X  |    | X  |           |    |    |
| 6    | 0.68 |    |    |    |           | X  |    |
| REV  | 3.09 |    |    | X  |           |    | X  |

FIG.3

TORQUE CONVERTER

This application is a national phase application of International application No. PCT/AU2005/001242, filed Aug. 18, 2005, which claims benefit from Australian application No. 2004904779, filed Aug. 20, 2004, both of which are hereby incorporated herein by reference in their entirety.

FIELD OF THE INVENTION

The present invention relates to a torque converter.

The invention has been primarily developed for use in a multi-gear automatic transmission for an automobile and will described hereinafter with reference to this application. However, the invention is not limited to this particular use.

BACKGROUND OF THE INVENTION

An automatic transmission of a vehicle commonly includes a torque converter for coupling the transmission to the vehicle's engine. The torque converter provides a fluid coupling which allows the engine to spin somewhat independently of the transmission so that the transmission can slow or stop without stalling the engine. Beneficially, the torque converter also provides a magnification of torque from the engine to the transmission when accelerating from a halt. However, at higher vehicle speeds where the speed of the transmission catches up to the speed of the engine the fluid coupling is less efficient than a rigid coupling between the transmission and the engine, and results in increased fuel consumption.

It has been proposed to provide a torque converter with a lockup clutch which provides a selectively operable direct connection between the engine and the transmission to eliminate slippage and to improve fuel efficiency. The lockup clutch has a driving part which is driven by the engine and a driven part which is in direct connection with the transmission. The driving part and the driven part are able to be brought selectively into frictional engagement so as to provide the direct driving connection between the engine and the transmission, and are able to be brought selectively out of frictional engagement when the direct connection is not desired, for example when the vehicle is at a standstill.

The applicant has determined that by providing more accurate control of the lockup clutch better fuel economy may be achieved.

SUMMARY OF THE INVENTION

In accordance with one aspect of the present invention, there is provided a torque converter, having a lockup clutch or a coupling device, for selectively providing a mechanical connection between a drive unit and a drive train, the lockup clutch or coupling device having a driving part connected to the drive unit and a driven part connected to the drive train, a control system for applying a first pressure in a sense to cause frictional engagement between the driving part and the driven part and a second pressure in a sense to cause disengagement of the driving part and the driven part, wherein a differential between the pressures is progressively controllable by the control system so as to control the relative positioning between the driven part and the driving part.

In accordance with another aspect of the invention, there is provided a torque converter having a lockup clutch or a coupling device, the lockup clutch having a driving part and a driven part engageable in response to a first pressure and disengageable in response to a second pressure, wherein a pressure differential between the pressures is progressively controllable by a control system so as to control the relative positioning between the driven part and the driving part.

Due to the progressive control of the differential between the first and second pressures, there is provided improved control of engagement/disengagement of the lockup clutch or coupling device, and in particular improved control of slippage of the lockup clutch or coupling device. This enables the lockup clutch or coupling device to be engaged at lower rotational speeds of the drive unit, thus resulting in improved fuel economy.

The coupling device preferably includes any one of: a wet starting clutch; a friction launch device; or a fluid coupling.

Preferably, the control system of the lockup clutch or coupling device provides progressive control of release of pressure from the lockup clutch or coupling device. More preferably, the control system provides progressive control of release of the second pressure from the lockup clutch or coupling device.

Preferably, each of the first pressure and the second pressure is progressively controllable.

Preferably, the driven part is a clutch plate and the driving part is a surface for engagement with the clutch plate.

Preferably, the first pressure is provided by hydraulic fluid in a first line communicating with the lockup clutch or coupling device and the second pressure is provided by hydraulic fluid in a second line communicating with the lockup clutch or coupling device.

Preferably, the first pressure is balanced with the second pressure to control positioning of the clutch plate relative to the surface. More preferably, the first pressure is balanced with the second pressure by a valve. Preferably, the valve receives feedback pressure from each of the first and second lines. Preferably, each of the first and second lines has a feedback line which is restricted so as to provide a desired proportion of the pressure in the line as feedback to the valve. Preferably, the valve has a spring for biasing the valve to a configuration whereby the lockup clutch or coupling device is disengaged. More preferably, operation of the valve is controlled by a variable bleed solenoid.

Preferably, the valve receives at a first input hydraulic fluid at a pressure regulated by a first pressure regulator, and receives at a second input hydraulic fluid at a pressure regulated by a second pressure regulator. Preferably, each of the pressure regulators has a feedback arrangement whereby the output of the regulator is fed back to the regulator.

In accordance with another aspect of the present invention, there is provided a transmission having a torque converter as described above.

In another aspect, there is provided a method of controlling engagement/disengagement of a lockup clutch or coupling device of a torque converter including the steps of:
  providing a first pressure in a sense to cause frictional engagement between a driving part and a driven part of the lockup clutch or coupling device;
  providing a second pressure to cause disengagement of the driving part and the driven part; and
  progressively controlling a differential between the pressures so as to control the relative positioning between the driven part and the driving part.

The coupling device preferably includes any one of: a wet starting clutch; a friction launch device; or a fluid coupling.

BRIEF DESCRIPTION OF THE DRAWINGS

A preferred embodiment of the invention will now be described, by way of an example only, with reference to the accompanying drawings, in which:

FIG. 1B is the diagrammatic sectional representation of FIG. 1A, showing additional reference numerals;

FIG. 3 is a table showing shift elements used in various gears offered by the transmission of FIGS. 1 and 2;

DETAILED DESCRIPTION OF THE PREFERRED EMBODIMENT

Introduction

Figure 1A:
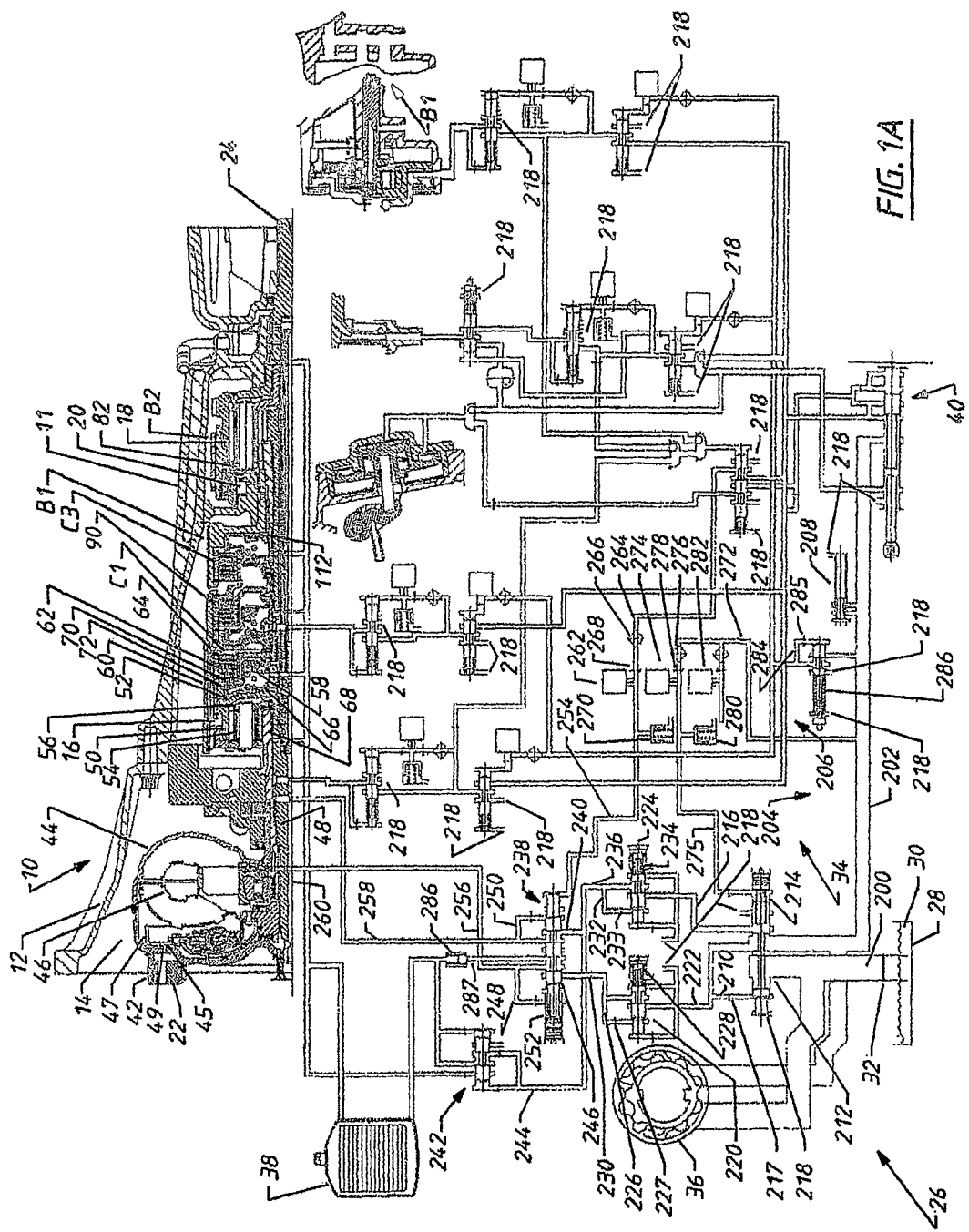
FIG. 1A is a diagrammatic sectional representation of a transmission, also showing a diagrammatic representation of an electro-hydraulic control system of the transmission.

An automatic transmission 10, particularly for use in a vehicle, has a bell housing 12 which houses a torque converter 14, three friction clutches C1, C2 and C3, two brake bands B1 and B2, a first, simple planetary gear set 16, a second, Ravigneux-type planetary gear set 18 and a one way clutch 20. As each of the clutches C1, C2 and C3 and brake bands B1 and B2 is a friction element (i.e. for selectively holding one part relative to another by friction), the transmission 10 thus has five friction elements in total. The transmission 10 uses these mechanical components to transmit power from an input 22 of the transmission 10 to an output 24 of the transmission 10, at a variety of ratios. The example transmission shown in the drawings provides six forward gears for forward propulsion of the vehicle, as well as a reverse gear for propelling the vehicle in reverse, and a neutral condition.

Figure 1C:
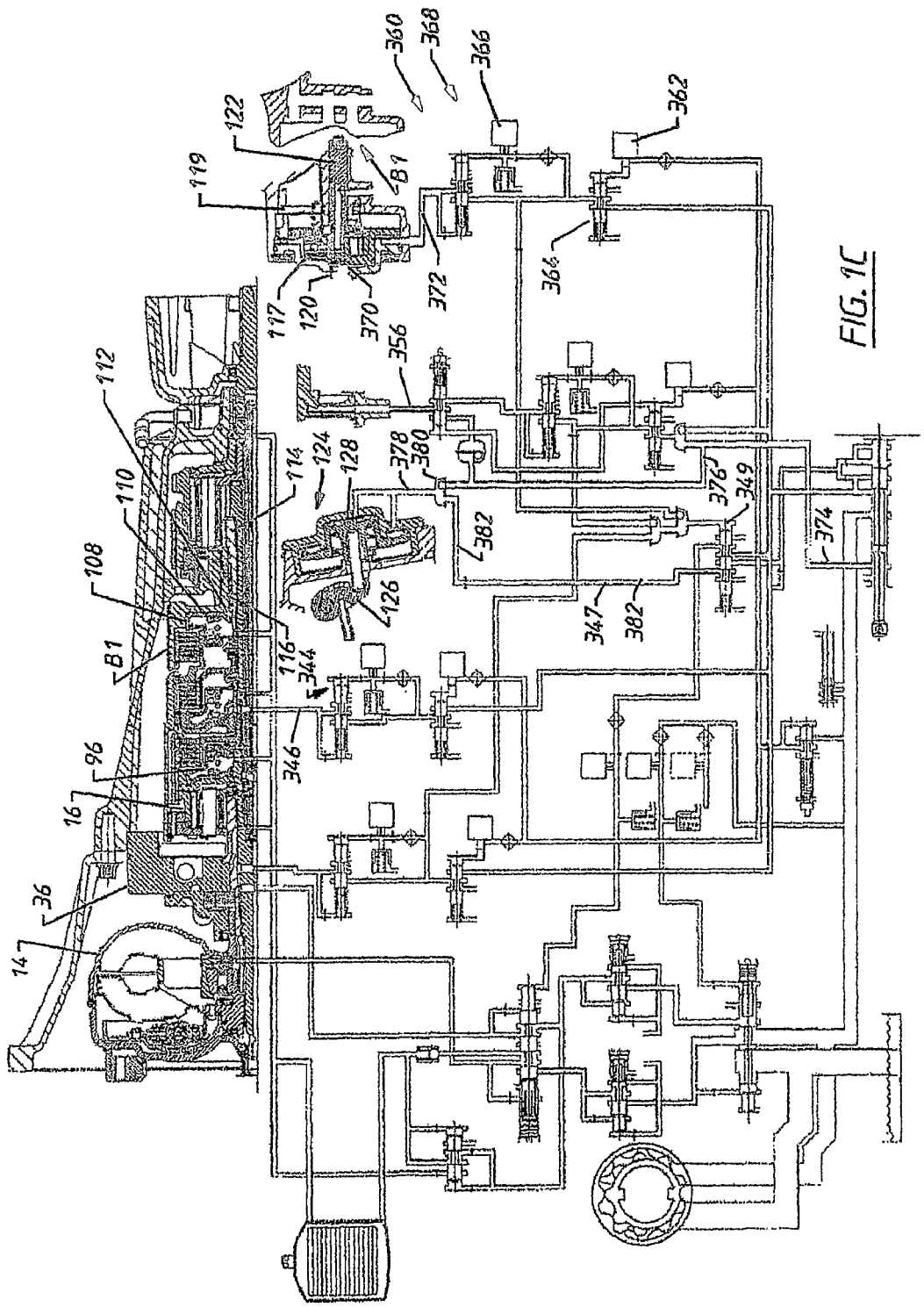
FIG. 1C is the diagrammatic sectional representation of FIGS. 1A and 1B, showing additional reference numerals.
Figure 2:
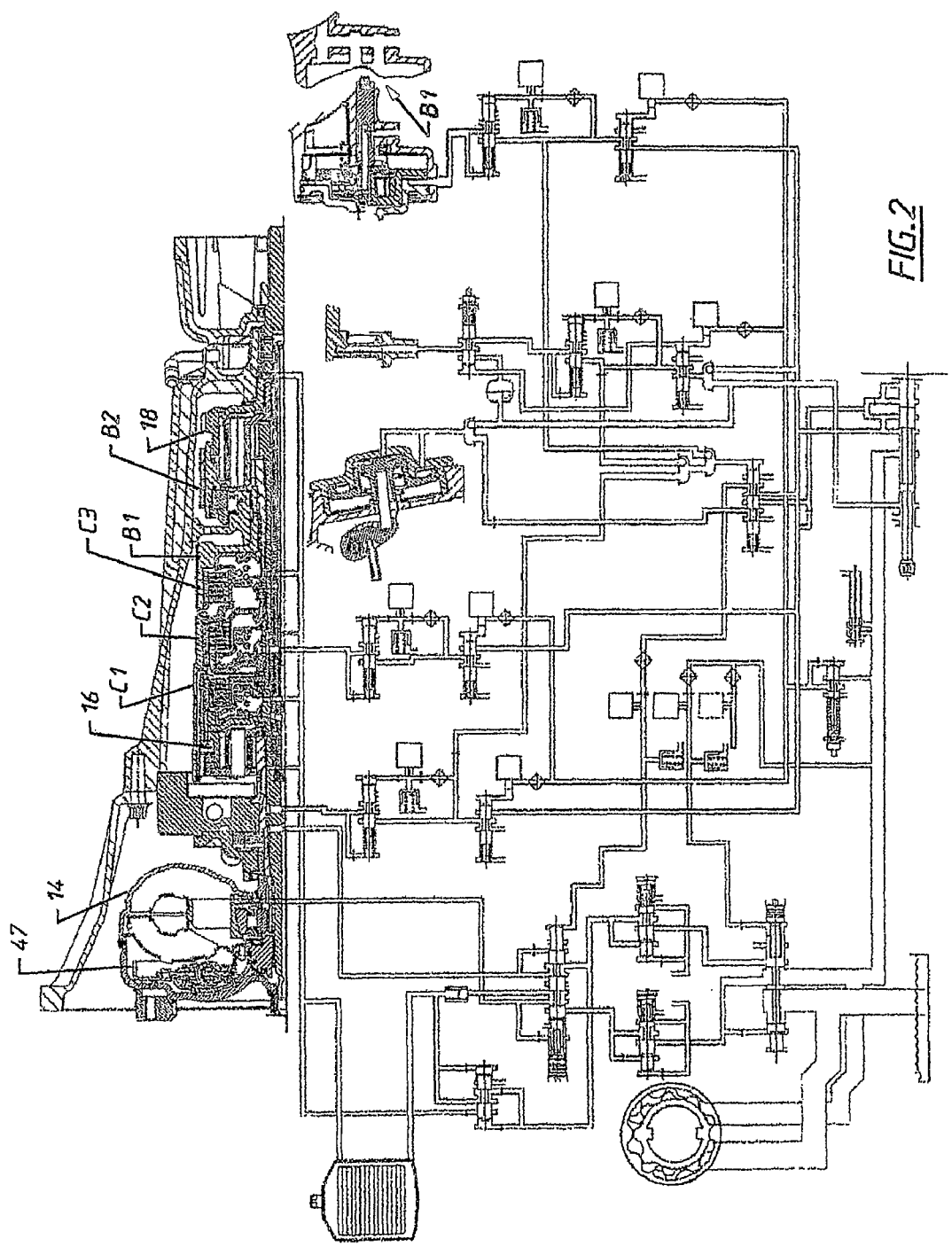
FIG. 2 is a sectional diagram of the transmission of FIG. 1.
Figure 4:
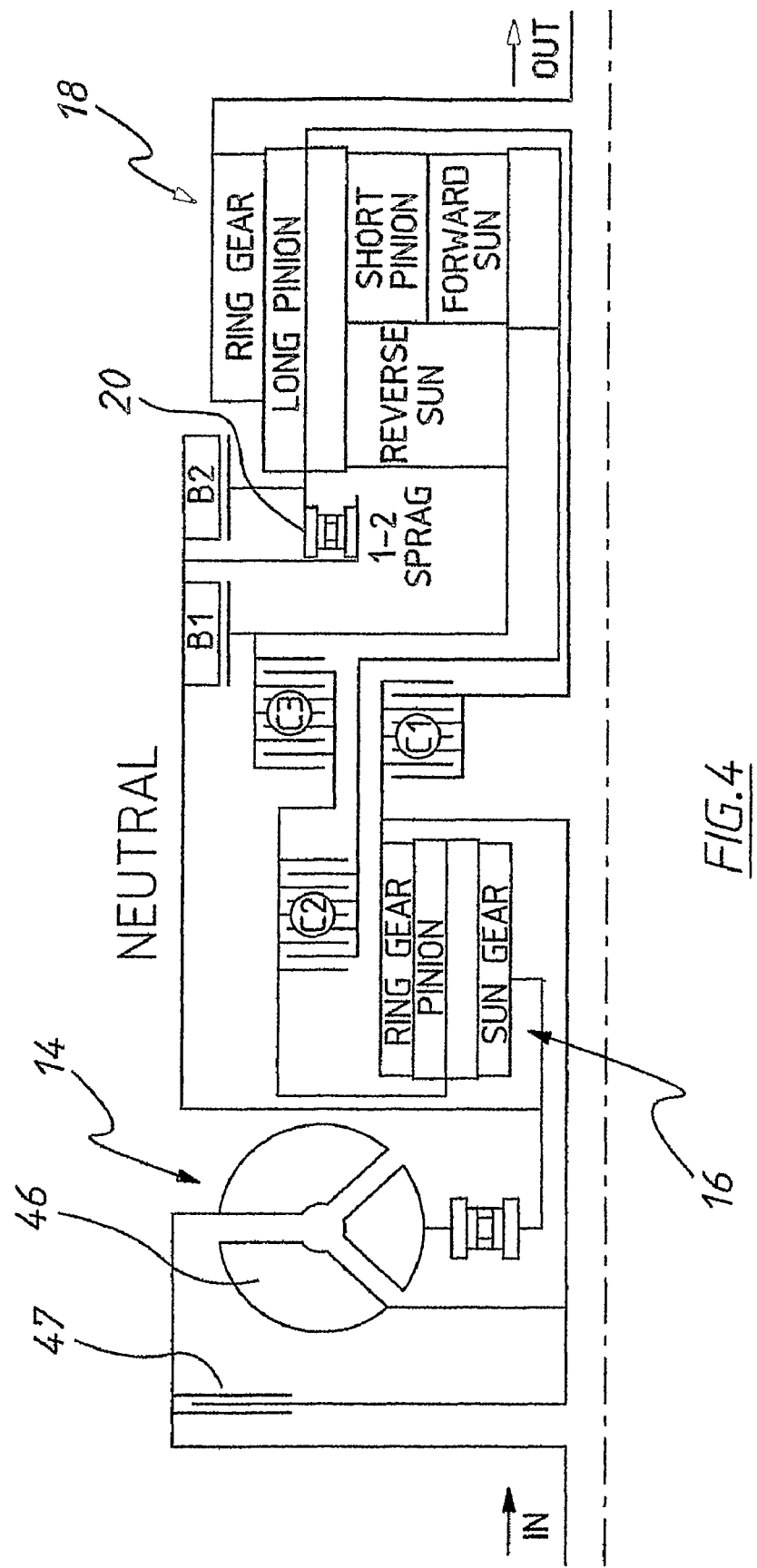
FIG. 4 is a power flow diagram of the transmission of FIGS. 1 and 2, showing a neutral state of the transmission.

As well as these mechanical components which perform the power transmission, the transmission 10 also includes an electro-hydraulic control system 26, as shown diagrammatically in the lower part of FIG. 1. The electro-hydraulic control system 26 has a sump 28 which holds a reservoir of hydraulic fluid 30 which is drawn through a filter 32 and into a network of hydraulic lines, indicated generally by reference numeral 34. The network of hydraulic lines 34 has a pump 36 for providing the hydraulic fluid with pressure so that it can flow through the network of hydraulic lines 34, a cooler 38 for cooling the hydraulic fluid 30, a manual valve 40 operable in response to movement of a gear selector of the vehicle by a driver of the vehicle, and various valves and solenoids throughout which control flow of the hydraulic fluid through the network 34 so as to operate the clutches C1, C2 and C3, the brake bands B1 and B2, and the torque converter 14, and to provide lubrication to the transmission 10. The solenoids are controlled by way of an electronic control system (not shown) which may form part of a CAN (Control Area Network) in which information is shared from other electronic control units (for example an engine control unit, traction control unit, anti-lock braking system control unit, air bag control unit etc.).

Mechanical Overview

In a typical mounting of the transmission 10 within a vehicle, an engine of the vehicle is bolted to the torque converter 14 by way of a flywheel of the engine being bolted to bolt anchor 42. As such, rotation of the flywheel is transmitted to a housing 44 of the torque converter 14. By way of hydraulic fluid 30 inside of the torque converter housing 44 forming a fluid coupling, power is transmitted from the housing 44 to a turbine 46 of the torque converter 14 by way of the fluid coupling. More particularly, fins on the inside of the housing 44 rotating in the hydraulic fluid 30 cause the hydraulic fluid to enter blades of the turbine 46, thus causing the turbine 46 to rotate. Power is transmitted from the turbine to an input shaft 48, which in turn transmits power to a ring gear 50 of the simple planetary gear set 16, via disc 52.

The torque converter 14 has a lockup clutch 47 for selectively locking the turbine 46 in mechanical connection with the housing 44. The lockup clutch 47 has a driven part in the form of a clutch plate 49 for engagement with a driving part in the form of a surface of a front wall 45 of the torque converter housing 44. The clutch plate 49 and surface are movable together one relative to the other in response to a first hydraulic pressure, and are movable apart in response to a second hydraulic pressure. The first pressure and the second pressure are progressively controlled and are balanced one relative to the other so as to control positioning of the clutch plate 49 relative to the surface of the front wall 45.

The ring gear 50 has teeth formed on its inside which mesh with teeth of a pinion gear 54 which is mounted for rotation about a carrier 56. The pinion 54 also meshes with a sun gear 58. The carrier 56 is connected to and transmits power to component 60 which also forms an input to clutch C2.

The input shaft 48 is also connected via disc 52 to an input 62 of clutch C1. Clutch C1 has five clutch plates 64 which are able to be brought into driving engagement by way of piston 66 being driven against compression spring 68 by hydraulic fluid being allowed into volume 70. As hydraulic fluid 30 enters volume 70, the piston 66 moves away from disc 52 such that volume 70 expands. This movement of the piston 66 causes an outer edge 72 of the piston 66 to clamp the clutch plates 64 into driving engagement.

The piston 66 is centrifugally balanced by hydraulic fluid in chamber 74 which prevents self-apply of the piston 66 owing to hydraulic fluid 30 being driven outwardly as rotation of the clutch C1 accelerates. As chamber 74 has a similar outward extent to volume 70, the effects of centrifugal force acting on the hydraulic fluid 30 are largely negated by the centrifugal force acting on the hydraulic fluid in the chamber 74. Each of the other clutches C2 and C3 also has a similar centrifugally balanced apply piston.

The clutch plates 64 are attached to and transmit power to component 76 which, in turn, transmits power to shaft 78 by way of spline 80. Shaft 78 transmits rotation to carrier 82 which carries short pinion 84 and long pinion 86 of the Ravigneux planetary gear set 18, by way of spline 88.

Clutch C2 has six clutch plates 90 which are able to be brought into driving engagement in response to movement of piston 92 against compression spring 94 as hydraulic fluid 30 is allowed into volume 96. The clutch plates 90 are attached to and transmit power to component 98 which, in turn, transmits power to shaft 99 by way of spline 100. Shaft 99 transmits power to a forward sun 102 of the Ravigneux planetary gear set 18.

Component 60 which also forms the input to clutch C2, is connected to and transmits power to six clutch plates 104 of clutch C3. The clutch plates 104 are able to be brought into driving engagement with an output 106 of clutch C3 under force from piston 108 as it is moved against compression spring 110 as a result of hydraulic fluid entering volume 112. The output 106 of clutch C3 is able to be held still relative to the bell housing 12 by way of brake band B1. The output 106 is also connected to reverse sun 114 of the Ravigneux planetary gear set 18 by way of spline 116.

Brake band B1 has a quick-apply piston 117 within a large force piston 119, with an integrated position sensor 120 which senses a position of a push rod 122 during a gearshift to an accuracy of 0.1 mm.

Both the reverse sun 114 and the forward sun 102 are in driving engagement with the long pinion 86, the forward sun 102 being in driving engagement with the long pinion 86 via the short pinion 84. The long pinion is meshed with a ring gear 118, which, in turn drives the output shaft 24 of the transmission 10. The carrier 82 about which the short and long pinions 84, 86 rotate is held relative to the bell housing 12 by the one way clutch 20. In particular, a sprag-type one way clutch allows rotation of the carrier 82 in only one direction relative to the bell housing 12. The carrier 82 is also able to be held stationary from rotation in either direction relative to the bell housing 12 by brake band B2.

A B2 brake band servo 124 is connected to the rear brake band B2 via a lever 126 that amplifies the apply force from a piston 128 of the servo 124 to the brake band B2. In the example of the transmission 10 shown, the one way clutch 20 is a Sprag type one way clutch 20. However, in alternative examples, the Sprag type one way clutch 20 could be replaced by a roller clutch, a mechanical diode or the like.

Hydraulic Overview

The electro-hydraulic control system 26 has a suction line 200 through which hydraulic fluid 30 is drawn from sump 28, through filter 32 to pump 36. The pump 36 is of a Parachoidal type, and is shown in its actual location in the sectional view of the transmission 10, between the torque converter 14 and the simple planetary gear set 16. The pump 36 is driven by the housing 44 of the torque converter 14 and pumps hydraulic fluid 30 through hydraulic line 202 which feeds the pressurised hydraulic fluid to a primary regulator valve 204, a solenoid supply valve 206, a line relief valve 208, and the manual valve 40. The manual valve 40 is operable in response to changes in the position of a gear selector, as made by a user of the vehicle to which the transmission 10 is fitted, for example by moving a T-bar gear selector, column shift, drive-by-wire control, push button selector, etc. as is the case in the particular vehicle.

The primary regulator valve 204 regulates pressure of hydraulic fluid in line 202 by way of feedback line 210. As pressure in the feedback line 210 increases, the piston 212 of the primary regulator valve 204 is caused to move to the right (as depicted in FIG. 1A) against the force exerted by compression spring 214 and the pressure of the fluid in hydraulic line 202 such that surplus pressure is used to feed hydraulic fluid to controls of the torque converter 14 along line 216 and to lubrication of the transmission 10. If further surplus pressure is present, the piston 212 moves further such that surplus pressure is dumped into suction line 200. The feedback line 210 is provided with a flow restricting orifice or baffle 217, the size of which is tuned so that the primary regulator valve 204 operates to a desired extent in response to pressure of the hydraulic fluid.

Various exhaust lines 218 are provided throughout the network of hydraulic lines 34 such that hydraulic fluid 30 can be released through these exhaust lines 218 to drain back into the sump 28.

Hydraulic fluid 30 is fed from the primary regulator valve 204 to an apply limit regulator 220 through line 222, and to a release limit regulator 224 through line 216. The apply limit regulator 220 has a feedback line 226 (with flow-restricting orifice 227) and compression spring 228 which operate in a manner similar to the feedback described previously in relation to the primary regulator valve 204 so that hydraulic fluid in line 230 is at a known pressure. The release limit regulator 224 similarly has a feedback line 232 (with flow-restricting orifice 233) and compression spring 234 so that hydraulic fluid in line 236 is at a known pressure. Each of the flow-restricting orifices 227, 233 in the feedback lines 226, 232 is sized to restrict flow so as to provide a desired proportion of the pressure in the line as feedback.

Hydraulic fluid from the apply limit regulator 220 is fed through line 230 to a torque converter regulator valve 238. Hydraulic fluid from the release limit regulator 224 is fed through line 236 to the torque converter regulator valve 238 (through line branch 240), and is also fed to a cooler/lube control regulator 242 (through line branch 244).

The torque converter regulator valve 238 has a piston 246 which operates in response to pressure from the hydraulic fluid fed through lines 230 and 240, pressure from hydraulic fluid fed through feedback lines 248 and 250, force from compression spring 252, and pressure from hydraulic fluid in line 254. In response to these inputs, hydraulic fluid is fed at varying rates along torque converter apply line 256 and torque converter release line 258. Hydraulic fluid fed through the torque converter apply line 256 causes flow of hydraulic fluid through the inside of the torque converter 14 which causes pressure build up on one side of the clutch plate 49. Conversely, hydraulic fluid fed through the torque converter release line 258 causes flow of hydraulic fluid through channel 260 between front wall 45 and the clutch plate 49, thus causing pressure build up on the other side of the clutch plate 49. By way of the torque converter regulator valve 238, the pressures on either side of the clutch plate 49 (and thus the pressure differential between these pressures) are able to be balanced for accurate control of slippage of the lockup clutch 47 by controlling positioning of the clutch plate 49 relative to the surface of the front wall 45 of the torque converter housing 44. When the pressure in apply line 256 is increased relative to the pressure in the release line 258, the torque converter is brought into a locked condition wherein the turbine 46 is locked to the torque converter housing 44 by frictional engagement of the clutch plate 49 against the surface of the front wall 45 of the housing 44. When the pressure in the release line 258 is increased relative to the pressure in the apply line 256, the torque converter is brought into an unlocked condition wherein the turbine 46 is unlocked relative to the housing 44 by disengagement of the clutch plate 49 from the front wall 45 of the housing 44. The pressure in the release line 258 is able to be released controllably by operation of the valve 238 in conjunction with variable bleed solenoid 262. The compression spring 252 biases the valve 238 to a configuration whereby the lockup clutch 47 is disengaged in the absence of pressure in line 254.

Figure 14:
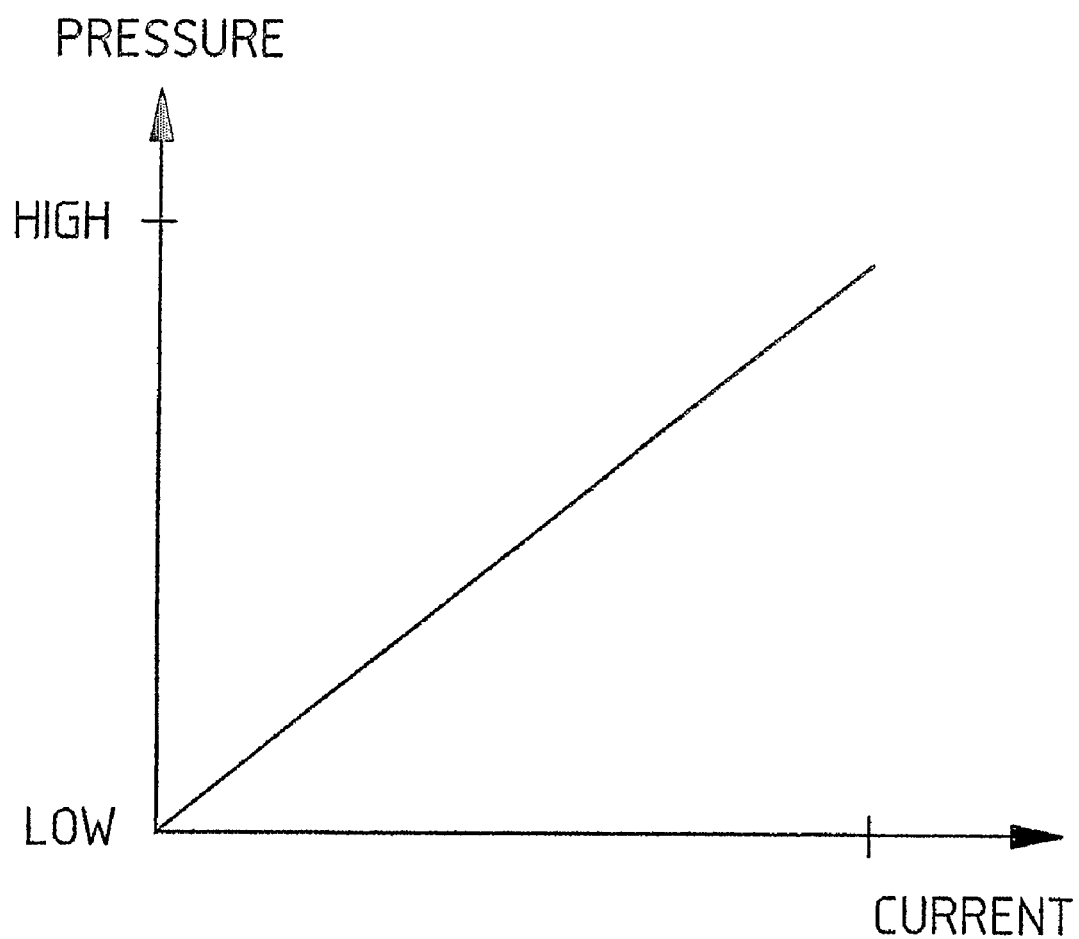
FIG. 14 is a diagrammatic graph of pressure versus current for a normally low variable bleed solenoid of the electro-hydraulic control system of FIG. 1.

Hydraulic fluid fed through line 254 to the torque converter regulator valve 238 is supplied from hydraulic line 202 through the solenoid supply valve 206 to the variable bleed solenoid (VBS) 262 via line 264. Flow of hydraulic fluid through the solenoid supply valve 206 is regulated by feedback line 284 (provided with flow-limiting orifice 285) and compression spring 286 in a similar manner as has been described previously. Line 264 has a thimble filter 266 for filtering the hydraulic fluid (e.g. for metal particles), as well as a flow-restricting orifice 268 for reducing amplitude of pressure fluctuations caused by the pump 36, and an accumulator 270 which further reduces pressure fluctuations and prevents hammer. The VBS 262 is controlled by an electronic control system in response to which it provides a controlled bleed of hydraulic fluid so as to progressively control pressure of hydraulic fluid in line 254 which is fed to the torque converter regulator valve 238 (as mentioned above) thus providing progressive control of pressure in torque converter apply line 256 and torque converter release line 258. As such, VBS 262 is a lockup pressure solenoid. VBS 262 is of a normally low (NL) type such that, in the absence of power supplied to the VBS 262, it will default to a condition wherein the output of hydraulic fluid is at low pressure. A graph of pressure versus current for a NL VBS is provided in FIG. 14.

Figure 13:
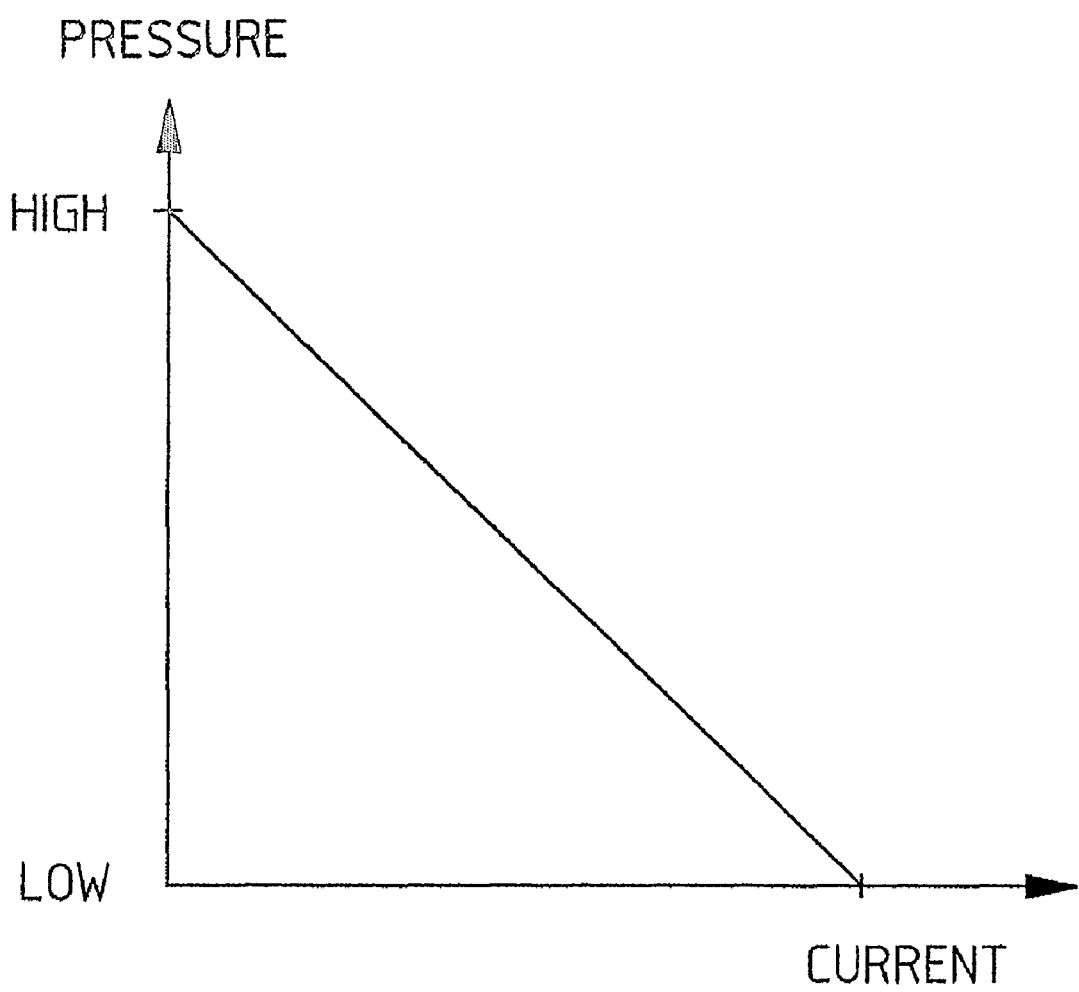
FIG. 13 is a diagrammatic graph of pressure versus current for a normally high variable bleed solenoid of the electro-hydraulic control system shown in FIG. 1.

The solenoid supply valve 206 also feeds hydraulic fluid along line 272 leading to VBS 274 by which flow of hydraulic fluid through line 275 is controlled. The VBS 274 is fitted in series with a thimble filter 276, a flow-restricting orifice 278 and an accumulator 280 in an arrangement similar to that described above for VBS 262. Hydraulic fluid fed through line 275 is received by the primary regulator valve 204 as a further input used to adjust the position of piston 212. As such, VBS 274 is a line pressure control solenoid. VBS 274 is of a normally high (NH) type such that, in the absence of power supplied to the VBS 274, it will default to a condition wherein the output of hydraulic fluid is at high pressure. A graph of pressure versus current for a NH VBS is provided in FIG. 13.

Provision for an additional VBS 282 is shown in broken lines. It is foreseen that such an additional VBS 282 may be used, for example, to control operation of a two-ratio decoupler unit used in combination with the 6 forward ratio transmission so as to provide a total of 7 forward ratios.

Flow of hydraulic fluid through the cooler 38 and for lubrication of the transmission 10 is provided by line 236, either via the torque converter regulator valve 238 and line 287, or via line branch 244 and cooler/lube control regulator 242. Line 287 is provided with an anti-drain back valve 286 to enable only one way flow of hydraulic fluid along the line 287. Line 244 is split into two line branches 288 and 290 which are both fed as inputs to the cooler/lube control regulator 242. Pressure from hydraulic fluid in these branches 288 290, together with pressure from hydraulic fluid in feedback line 292 dictate movement of a piston 294 of the cooler/lube control regulator 242 to determine distribution of hydraulic fluid through a cooler line 296 and a cooler bypass line 298. Hydraulic fluid leaving the cooler 38 rejoins hydraulic fluid in the cooler bypass line 298 at line junction 300, from where it is distributed to parts of the transmission 10 along line 302 as lubricant.

Each of the clutches C1, C2 and C3 is controlled by a similar electro-hydraulic control setup having an on/off (O/I) solenoid which operates a shift valve for controlling flow of hydraulic fluid to a VBS. The VBS controls flow of hydraulic fluid to a clutch regulator valve which, in turn, controls flow of hydraulic fluid to the clutch piston to engage/disengage the clutch.

Figure 15:
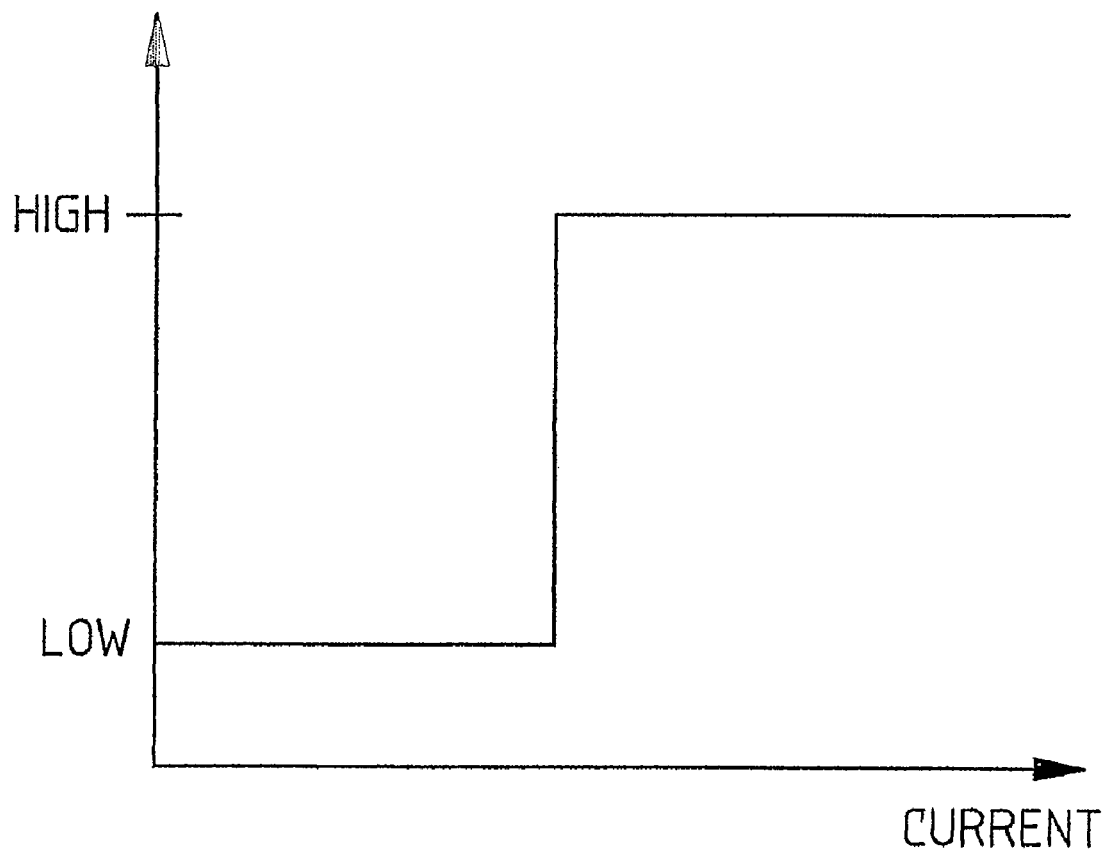
FIG. 15 is a diagrammatic graph of pressure versus current for a normally low O/I solenoid of the electro-hydraulic control system of FIG. 1.

More particularly, control of clutch C1 is achieved by way of hydraulic fluid fed from hydraulic line 202 through manual valve 40 (when manual valve 40 is in a drive position) along drive hydraulic line 304 and line 306 to C1 shift valve 308. C1 shift valve 308 is operated by an O/I solenoid 310 which receives hydraulic fluid from the solenoid supply valve 206 along line 312. Line 312 includes a thimble filter 314 just upstream of the O/I solenoid 310. The O/I solenoid 310 is of a normally low (NL) type such that in the absence of power supplied to the O/I solenoid 310 it defaults to a low pressure state, as illustrated in FIG. 15. The C1 shift valve 308 controls feed of hydraulic fluid to VBS 316 the output of which is fed to C1 regulator valve 318. Line 320 to which the VBS 316 is fitted is also provided with a thimble filter 322, an accumulator 324, and an orifice 326, 328 on either side of the VBS 316. A piston 330 of the C1 regulator valve 318 moves in response to pressure from hydraulic fluid in lines 320, 332 and feedback line 334. The output of the C1 regulator valve 318 is fed through line 336 to the volume 70 of clutch C1 so as to move piston 66. VBS 316 is a normally high VBS.

Clutch C2 is controlled by a similar setup comprising O/I solenoid 338, C2 shift valve 340, VBS 342, and C2 regulator valve 344 which controls flow of hydraulic fluid to volume 96 via line 346 to control movement of piston 92. VBS 342 is a normally high VBS. Flow of hydraulic fluid to C2 regulator valve 344 along line 347 is controlled by $1^{st}$ gear bias valve 349, which also controls flow of hydraulic fluid to rear servo 124 (via line 382) when the transmission 10 is in manual first gear.

Clutch C3 is also controlled by a similar setup comprising O/I solenoid 348, C3 shift valve 350, VBS 352, and C3 regulator valve 354 which controls flow of hydraulic fluid to volume 112 via line 356 to control movement of piston 108. VBS 352 is a normally low VBS.

Front servo 360 for engaging brake band B1 is also controlled by an arrangement similar to that used for the clutches C1, C2 and C3. More particularly, the arrangement comprises O/I solenoid 362, B1 shift valve 364, VBS 366, and B1 regulator valve 368 which controls flow of hydraulic fluid to volume 370 via line 372 to control movement of piston 117 (and thus push rod 122. VBS 366 is a normally low VBS.

When the transmission 10 is in reverse gear, the rear servo 124 is actuated by way of hydraulic fluid fed through reverse hydraulic line 374, and lines 376 and 378. A ball check valve 380 is provided at the end of line 376 and prevents unwanted back-flow from line 376 into line 382, or vice-versa.

Although in the example shown the manual valve 40 has four position valve movement (i.e. P (park), R (reverse), N (neutral) and D (drive)), the broken lines to the right-hand side of the manual valve 40 show that it may also be configured to have seven position valve movement (for example, to include gears 4, 2 and 1). Of course, it should also be understood that the manual valve may also have a different number (i.e. other than 4 or 7) of positions of valve movement.

So, the hydraulic control system in the transmission described has four On/Off (O/I) solenoids 310, 338, 348, 362 and six Variable Bleed Solenoids (VBS) 262, 274, 316, 342, 352, 366 (plus proposed additional VBS 282). It should be understood that any of these solenoids could be substituted with solenoid types having equivalent function, for example, Pulse Width Modulated type (PWM), Variable Pressure/ Force Type (VPS/VFS), bleed solenoids etc.

Each friction element in this transmission 10 design, be it a clutch C1, C2 or C3 or brake band B1 or B2, is able to be individually electro-hydraulically controlled during gearshifts, thus providing the calibration/application engineer with full range control of gearshift quality and also enabling the control system itself to adjust to wear or leakages that develop during the life of the transmission 10. Because the control system has full range control over any of the friction elements, it is possible to also effect a neutral condition when the transmission 10 is in Drive or Reverse, for example when the vehicle is stopped at traffic lights. This results in improved fuel economy as the transmission 10 will not load the engine when idling for extended periods, for example in traffic. This "Neutral-in-Drive" feature would happen without the knowledge of the driver.

The control system consists of key features that enable various control methodologies to be employed when engaging or disengaging the clutches C1, C2 and C3 and brake bands B1 and B2, and by virtue of the ability to bypass VBSs not being used, has the ability to reduce leakage of pressure of hydraulic fluid and thus fuel consumption. Line pressure can be controlled by way of VBS 274 to any level within the design limits and can hence also be used for clutch/brake band engagement control or to effect abuse protection. The line pressure system is a line-priority system, which maintains line pressure under low oil conditions and sacrifices other circuit demands like cooler flow to maintain this pressure. Although the pump 36 shown is a Parachoidal type, this could be substituted with any other suitable pump such as a Gerotor, Crescent, or Vane pump.

The torque converter lockup circuit comprising the apply limit regulator 220, release limit regulator 224, torque converter regulator valve 238 and lockup pressure regulator solenoid 262 is designed in such a way so as effect control over pressure on both sides of the lockup clutch 47, thus enabling controlled slip of the lockup clutch 47 against the front wall 45 of the torque converter housing 44.

The torque converter regulator valve 238 is a unique design that has two feedback areas 248, 250—one for the apply pressure and one for the release pressure. The design of the torque converter regulator valve 238 and its sizing is done in such a way that the valve 238 will always act to achieve a certain differential pressure between these two circuits. In order to successfully control these two pressures, the torque converter regulator valve 238 requires a known supply pressure source. This is achieved by feeding the torque converter regulator valve 238 with two separate regulators, the apply limit regulator 220 and the release limit regulator 224. These two regulators 220, 224 are set to a fixed pressure that enables the source oil to the torque converter regulator valve 238 to be preset. Based on a third input from the lockup pressure regulator VBS 262 into the torque converter regulator valve 238, the torque converter regulator valve 238 will apply or release the lockup clutch 47 while maintaining a preset pressure differential across the lockup clutch 47.

The lubrication circuit is designed so that if the cooler 38 becomes blocked, or flow is limited during very low temperature operation, the lubrication oil can bypass the cooler 38 and pass directly into the lube distribution line 302.

The transmission 10 is also fitted with an input shaft speed sensor and an output shaft speed sensor. The input speed sensor provides a speed signal, whilst the output speed sensor provides both a speed and rotation direction signal. This rotation direction is important for certain clutch and band apply strategies, especially in the case of a Neutral-Drive or Neutral-Reverse selection where the vehicle direction of movement is important to maximise effective shift control. The combination of these two speed sensors enables closed loop or adaptive control strategies along with transmission slip diagnostics to be performed.

The hydraulic circuit 26 is arranged in such a way so that in the event of total electrical power loss to the transmission solenoids (i.e. O/I solenoids and VBSs) the transmission 10 is still able to maintain Park, Reverse, Neutral and Drive ($4^{th}$) whilst maintaining cooler flow, maximum line pressure and lubrication flow.

Operation of the Transmission

Operation of the transmission through the six forward gears (including First and Manual First Gears), Reverse and Neutral is described below.

1. First Gear

Hydraulically, first gear is engaged by the operator first moving the T-Bar or Column Shift or other gear direction command mechanism into the drive position. This then causes the manual valve 40 in the transmission 10 to move into the drive position; this movement can be executed using a lever, cable, actuator or solenoid. Once in the drive position, the manual valve 40 allows oil to flow to the relevant drive circuits of the valve body and pump cover thus energising the clutch and brake band shift valves with hydraulic pressure. These shift valves are electro-hydraulically controlled and will not allow oil pressure into the clutch or brake band engagement circuits until commanded by the electronic control unit. Once these valves have been pressurised, a Neutral-Drive shift can be executed by electro-hydraulically commanding the C2 shift valve 340 to toggle (using the O/I solenoid 338, VBS, PWM or similar) into a position where it allows oil pressure and flow to pass through it into the feed to the regulator valve circuit. At the same time, oil is fed to the regulator valve pressure control solenoid (which can be a PWM, VFS, VPS, VBS 342 or similar). The clutch engagement can be now be executed by electro-hydraulically ramping the C2 clutch on using the regulator valve 344 in combination with the pressure control solenoid. Thus, the shift feel of the N-D shift can be controlled by the electronic controller and can be tailored/calibrated to suit a variety of vehicle conditions and driver inputs. Abuse protection is also effected by de-energising the clutch to protect the driveline if an abuse protection software algorithm has been initiated. By only feeding oil to the individual pressure control solenoids when the shift valves are actuated allows the leakage associated with these types of solenoids to be limited to conditions only where the solenoid needs to be used. When the solenoid is not required, oil is not fed to it and hence no leakage is demanded from the hydraulic circuit and the pump size can then be optimised resulting in maximum fuel economy benefits.

As an alternative control method for the engagement of the C2 clutch, the clutch regulator valve 344 can be set to maximum pressure during the N-D process, this would normally result in a harsh shift shock, however, to alleviate this, the line pressure control solenoid 274 can be used to ramp the line pressure or source oil on slowly, thus resulting in a smooth engagement.

Figure 5:
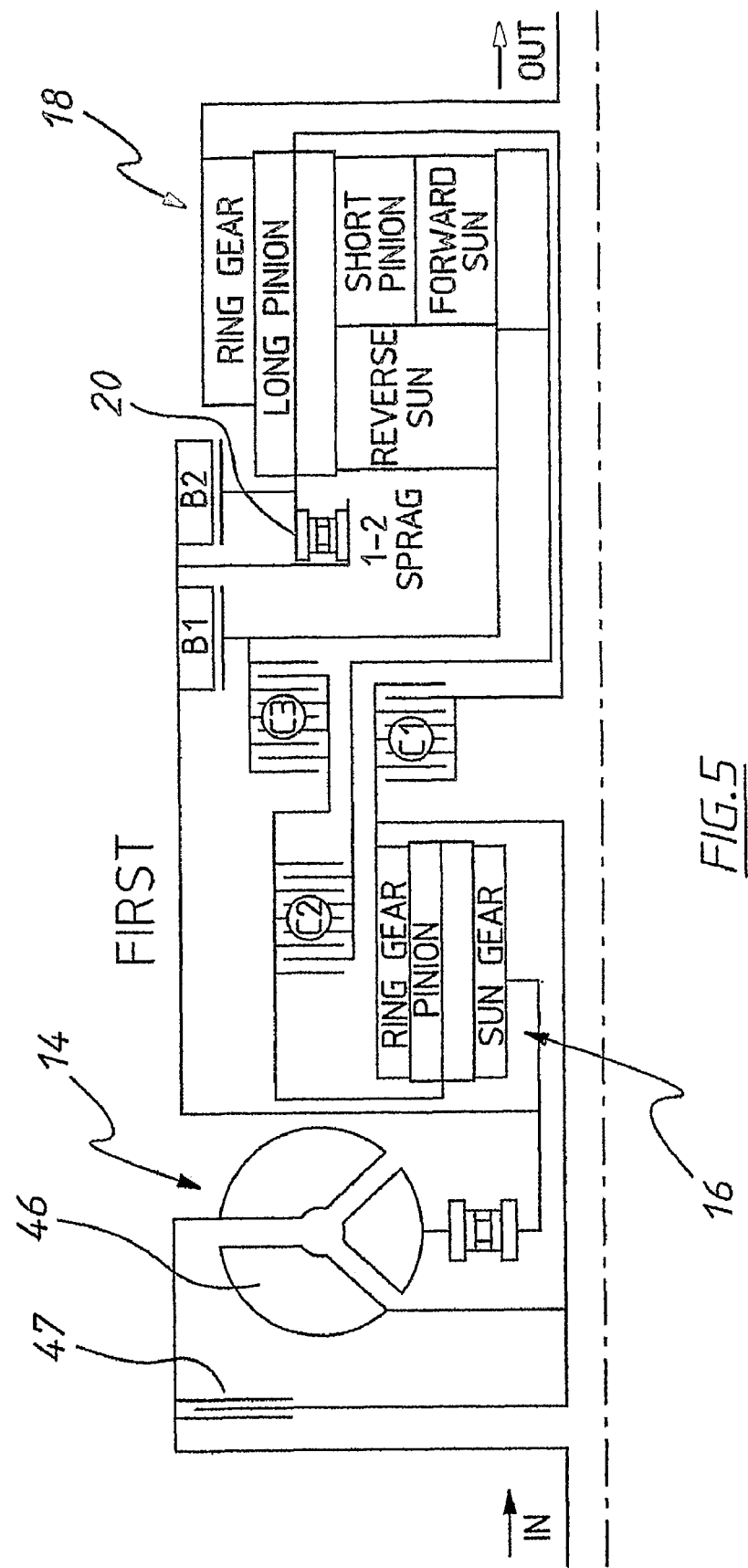
FIG. 5 is a power flow diagram of the transmission of FIGS. 1 and 2, showing power flow in a first gear state of the transmission.

Power flow for first gear is shown diagrammatically in FIG. 5.

Mechanically, the input comes from the torque converter 14 and through the front reduction gear set, in the form of planetary gear set 16. The clutch C2 is engaged, providing the input to the rear planetary gear set 18, and power flow is routed through the 1-2 Sprag-type one way clutch 20 so that the carrier reaction torque is taken by the one way clutch 20. There is no engine braking therefore the vehicle can coast. Mechanical lockup is not provided through the lockup clutch 47 in the torque converter 14 as this is prevented in the electro-hydraulic control system 26. With this arrangement, it can be seen that first gear can be achieved with only one friction element (C2) being engaged by an electro-hydraulically controlled hydraulic piston 66. Although identified as a 1-2 Sprag-type one way clutch, a learned person can identify that this same function could be achieved with a similar device, for example a roller clutch, mechanical diode or the like.

2. Manual First Gear

Figure 6:
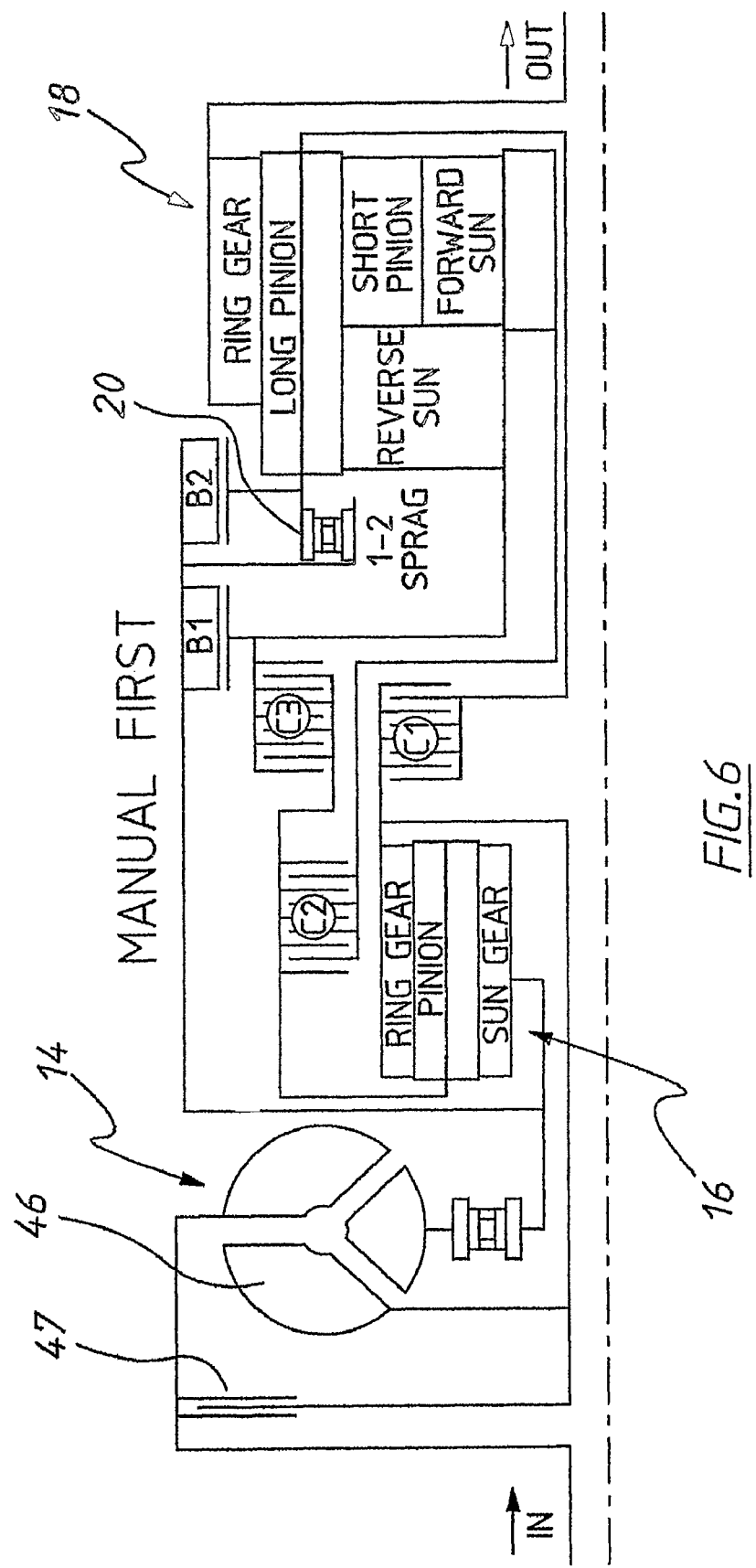
FIG. 6 is a power flow diagram of the transmission of FIGS. 1 and 2, showing power flow in a manual first state of the transmission.

Power flow for manual first gear is shown diagrammatically in FIG. 6.

Manual first gear is similar to first gear, except that the B2 brake band is also applied (thus power flow bypasses the one way clutch 20) to prevent overrun and allow engine braking to be effected. In manual first gear, the input comes from the torque converter 14 and through the front reduction gear set 16. Clutch C2 is on, providing the input to the rear gear set 18. Brake band B2 locks the carrier assembly 82 and takes the reaction, hence, engine braking is provided in manual first with only one clutch and the B2 brake band being engaged. Mechanical lockup is not provided through the lockup clutch 47 in the torque converter 14, the electro-hydraulic control system 26 having an override valve that prevents lockup from occurring.

Hydraulically, the circuit is the same as for first gear except that the B2 brake band is also electro-hydraulically engaged and can be ramped on or off during engagement or disengagement. As soon as the transmission 10 is shifted into second gear, the first gear bias valve 349 toggles and robs the B2 circuit (via line 347) of oil supply, thus preventing the B2 brake band staying on and causing tie up.

3. Second Gear

Figure 7:
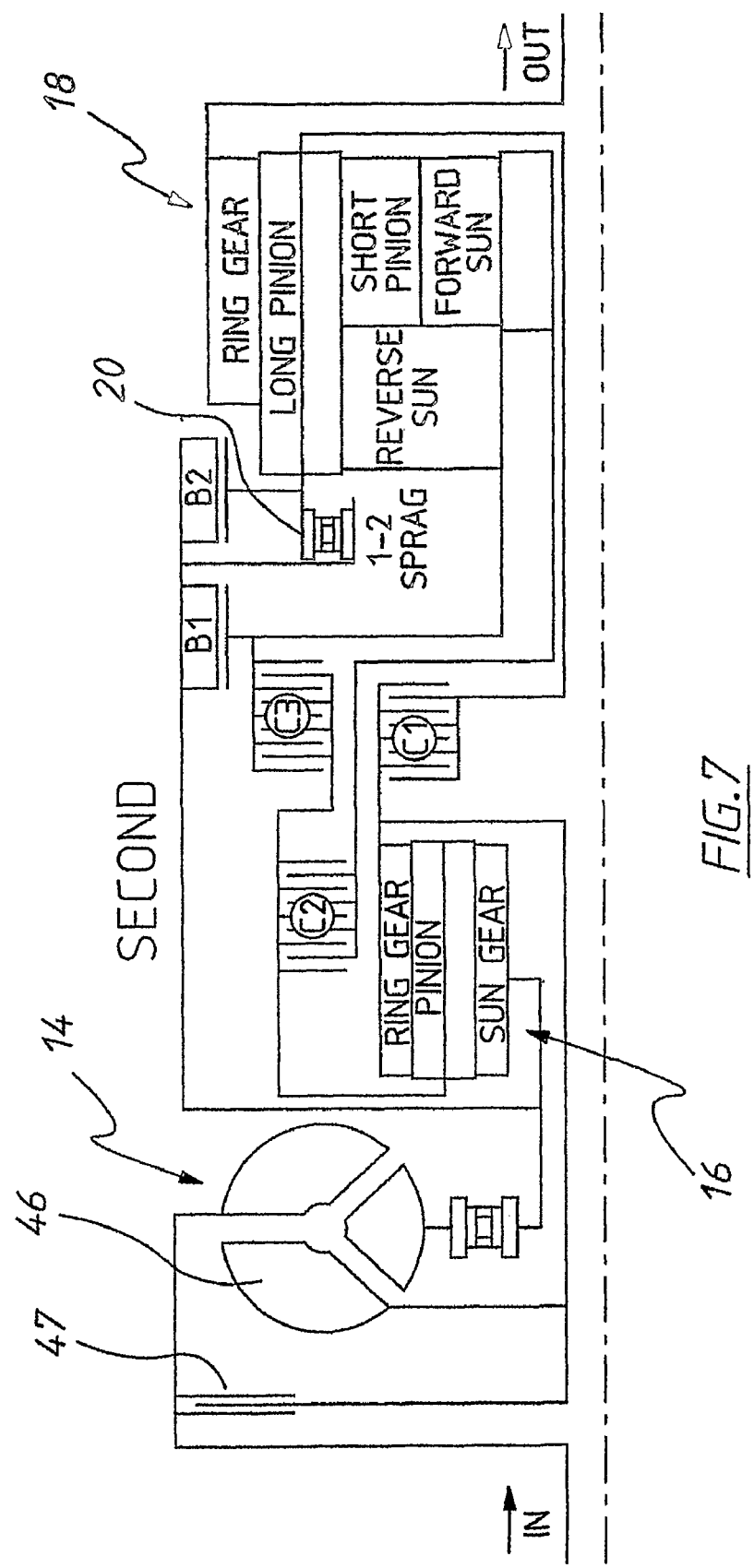
FIG. 7 is a power flow diagram of the transmission of FIGS. 1 and 2, showing power flow in a second gear state of the transmission.

Power flow for second gear is shown diagrammatically in FIG. 7.

Second gear is obtained by keeping clutch C2 energised in the first gear state and then by engaging brake band B1. This locks the reverse sun gear 102 and the carrier assembly 82 thereby causing the rear planetary gearset 18 to overrun the 1-2 mechanical Sprag-type one way clutch 20. Mechanical lockup is provided through the lockup clutch 47 in the torque converter 14. This lockup clutch 47 would normally be fitted with a damper assembly to dampen out engine-induced vibrations and the lockup clutch 47 can also employ pressure differential controlled slip to further alleviate torsional vibrations. The pressure differential controlled slip is achieved by virtue of control of pressure on either side of the lockup clutch 47 by the torque converter regulator valve 238 in combination with the apply limit regulator 220 and the release limit regulator 224. This enables precise control of engagement of the lockup clutch 47 against the front wall 45 of the housing 44 of the torque converter 14. This results in the engine speed at which lockup is introduced to be lowered over conventional damper-only systems thus maximising fuel economy benefits. This applies to all gear states where lockup is activated.

Figure 16:
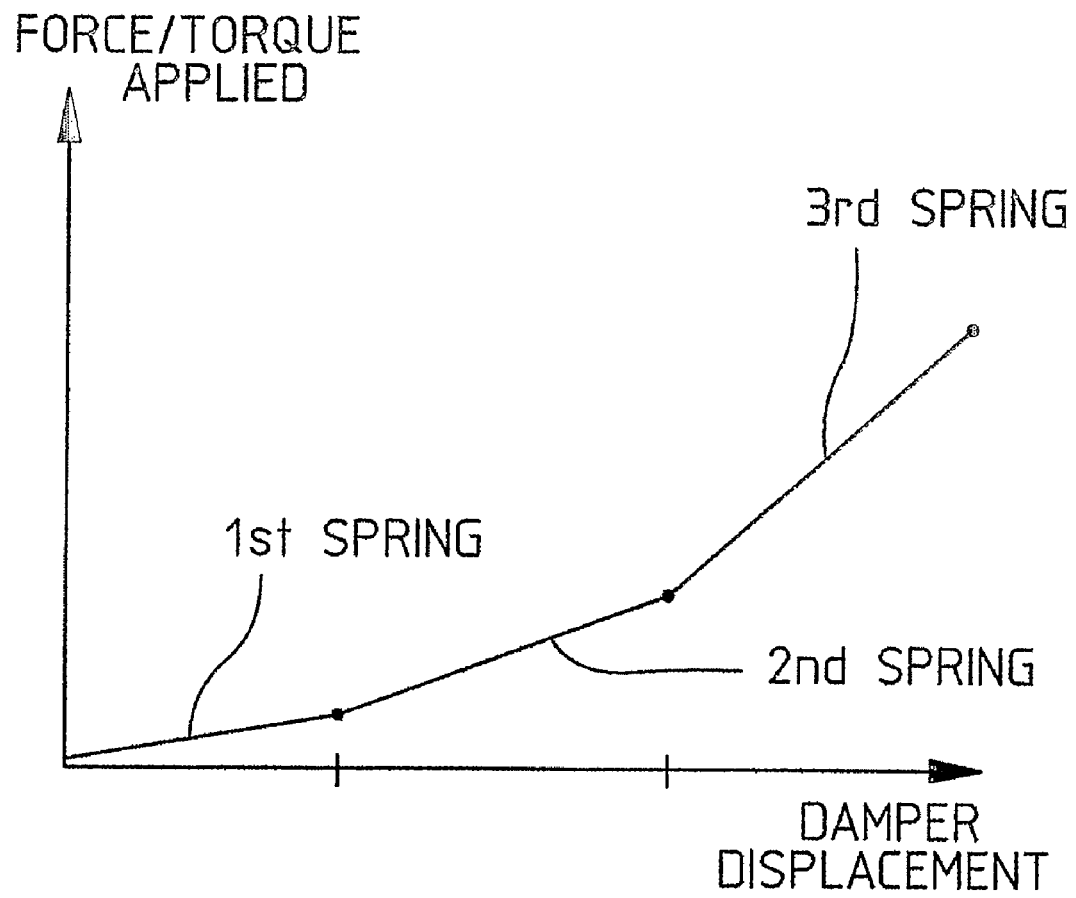
FIG. 16 is a diagrammatic graph of force/torque applied versus damper displacement for a damper of a lockup clutch of a torque converter of the transmission of FIGS. 1 and 2.

A multi-stage (for example a three-stage) damper may be provided by fitting the lockup clutch 47 with dampers of different rates in series such that the damper displacement is staged against force/torque applied, as shown in FIG. 16. Such multi-staging of the damper enables improved suppression of vibrations at a range of frequencies.

Hydraulically, at the start of the shift, line pressure is increased to a level higher than that required for the shift event. Then, the relevant B1 shift valve 364 is electro-hydraulically actuated and will not allow oil pressure into the B1 brake band engagement circuit (i.e. to B1 regulator valve 368) until commanded by the electronic control unit. Once this valve 364 has been energised, oil is supplied to the B1 regulator valve 368 and VBS 366 and a 1-2 shift can be executed by electro-hydraulically commanding the B1 regulator valve pressure control solenoid 366 to increase the pressure in the B1 band apply piston circuit. The B1 engagement can be now be executed by electro-hydraulically ramping the B1 brake band on using the regulator valve 368 in combination with the pressure control solenoid 366. Thus, the shift feel of the 1-2 shift can be controlled by the electronic controller and can be tailored/calibrated to suit a variety of vehicle conditions and driver inputs.

As an additional input to the electronic controller, a band push rod position sensor 120 is included in the front servo push rod and cover. This sensor 120 informs the controller of the position of the engagement of the brake band B1 so that different control methodologies can be applied. These can include, rapid uptake of brake band B1 clearance followed by slow controlled apply, or slow torque reduction followed by rapid disengagement. Abuse protection is also effected by de-energising the brake band to protect the driveline if the abuse protection software algorithm has been initiated.

4. Third Gear

Figure 8:
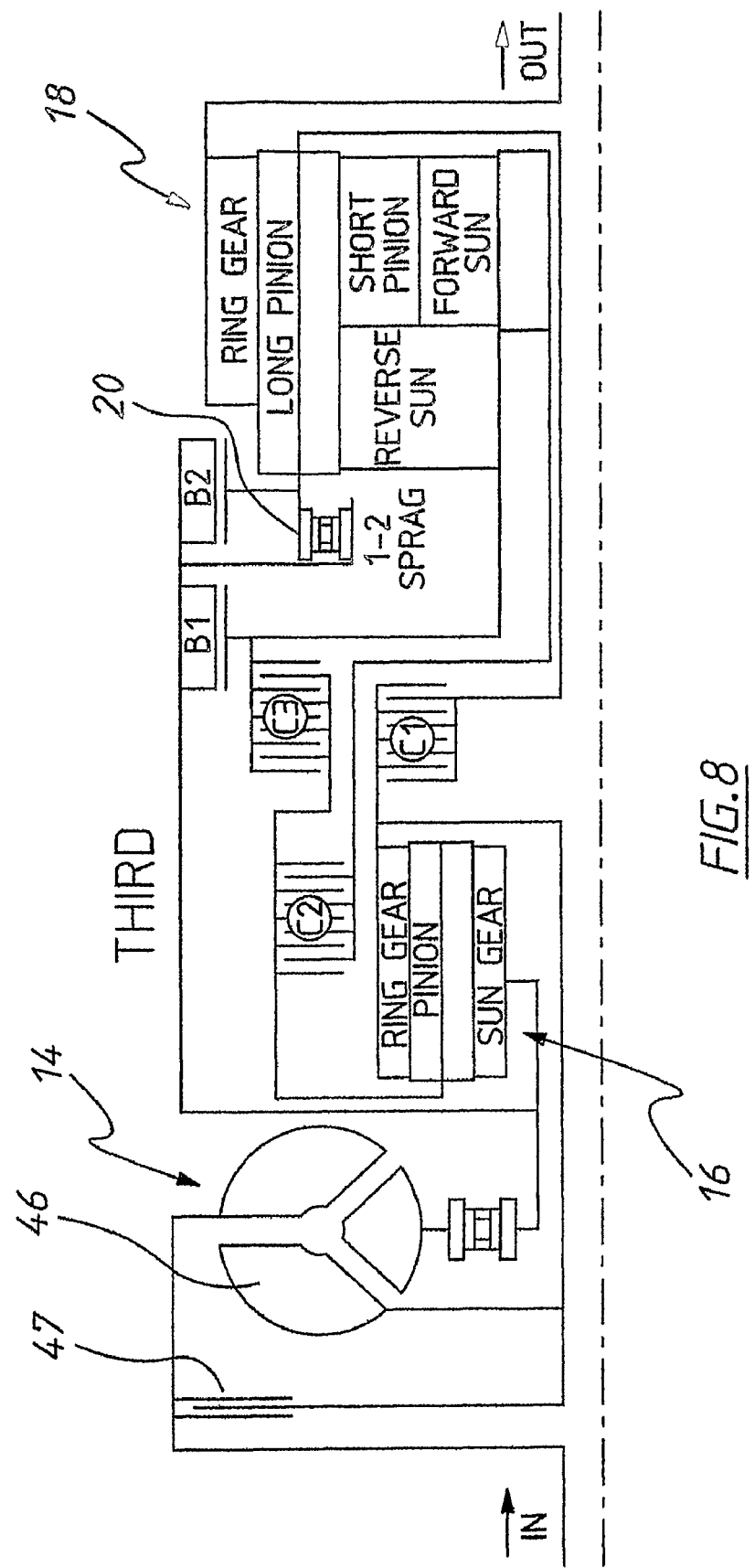
FIG. 8 is a power flow diagram of the transmission of FIGS. 1 and 2, showing power flow in a third gear state of the transmission.

Power flow for third gear is shown diagrammatically in FIG. 8.

Third gear is achieved by engaging clutches C2 and C3. This locks the rear gearset 18 together in a 1:1 ratio. The total transmission output ratio is then equal to the ratio of the front gear set 16. Mechanical lockup is provided through the lockup clutch 47 in the torque converter 14.

Hydraulically, at the start of the shift, line pressure is increased to a level higher than that required for the shift event. Then, the relevant C3 shift valve 350 is electro-hydraulically actuated and will not allow oil pressure into the C3 engagement circuit until commanded by the electronic control unit. Once this valve 350 has been energised, oil is supplied to the C3 regulator valve 354 and VBS 352 and a 2-3 shift can be executed by electro-hydraulically commanding the B1 regulator valve pressure control solenoid 366 to decrease the pressure in the B1 band apply piston circuit and at the same time, commanding the C3 regulator valve pressure control solenoid 352 to ramp pressure on, in effect swapping the B1 circuit with the C3 circuit. Once the B1 circuit has lost torque carrying capacity, the C3 circuit can now finish the shift event off by electro-hydraulically finishing ramping the C3 clutch on using the regulator valve 354 in combination with the pressure control solenoid 352. Thus, the shift feel of the 2-3 shift can be controlled by the electronic controller and can be tailored/calibrated to suit a variety of vehicle conditions and driver inputs.

5. Fourth Gear

Figure 9:
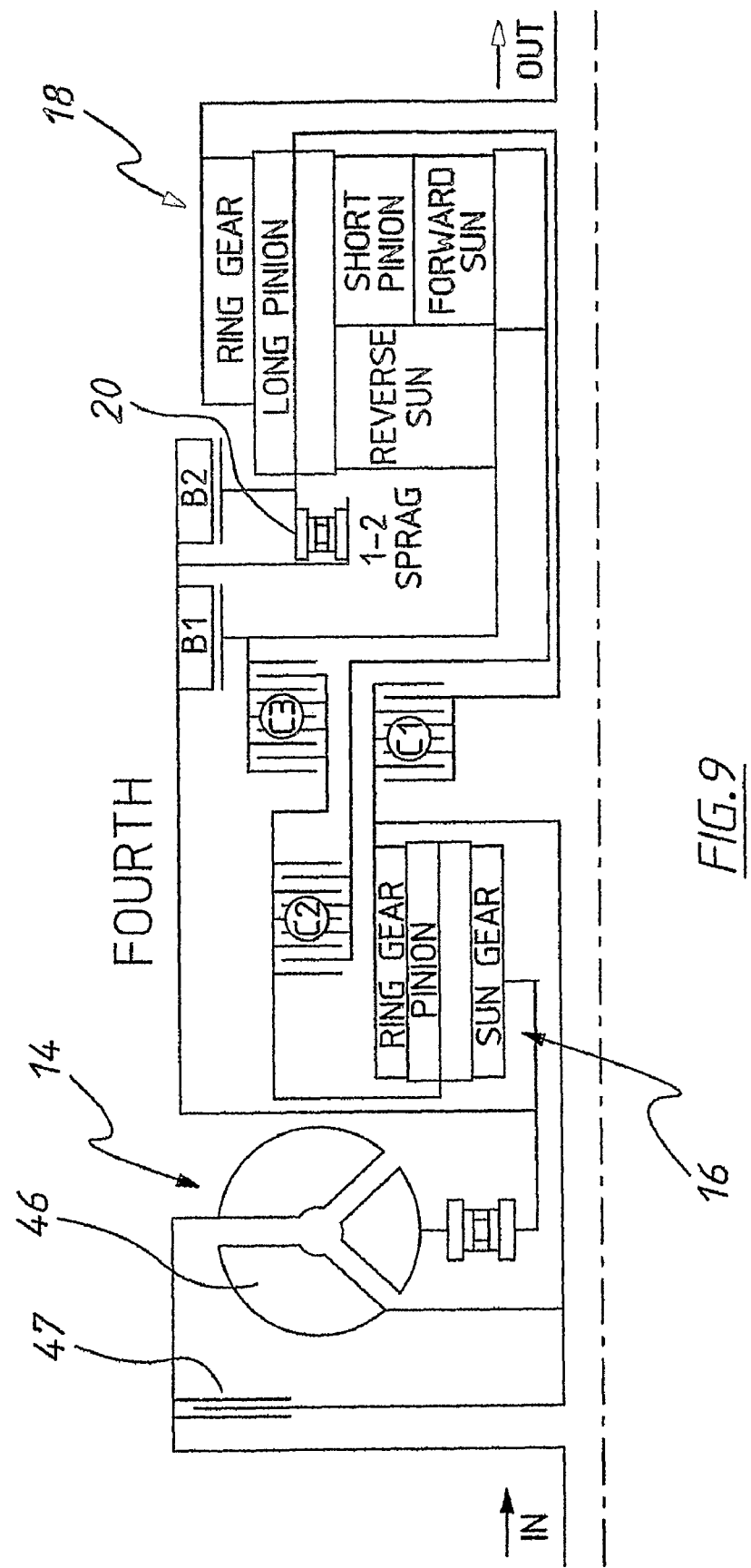
FIG. 9 is a power flow diagram of the transmission of FIGS. 1 and 2, showing power flow in a fourth gear state of the transmission.

Power flow for fourth gear is shown diagrammatically in FIG. 9.

Fourth gear is obtained by having two inputs to the rear gearset 18. One input is from the front reduction gearset 16 and clutch C2, and the other is directly from the input shaft 48 (via clutch C1). The C1 clutch links the carrier assembly 82 of the rear gearset 18 to the input shaft 48 while the forward sun gear 102 is driven from the output of the front gearset 16 through the C2 clutch. Mechanical lockup is provided through the lockup clutch 47 in the torque converter 14.

Hydraulically; the 3-4 shift is effected in the same way as the 2-3 shift except that the C3 circuit is ramped off while the C1 circuit is ramped on.

6. Fifth Gear

Figure 10:
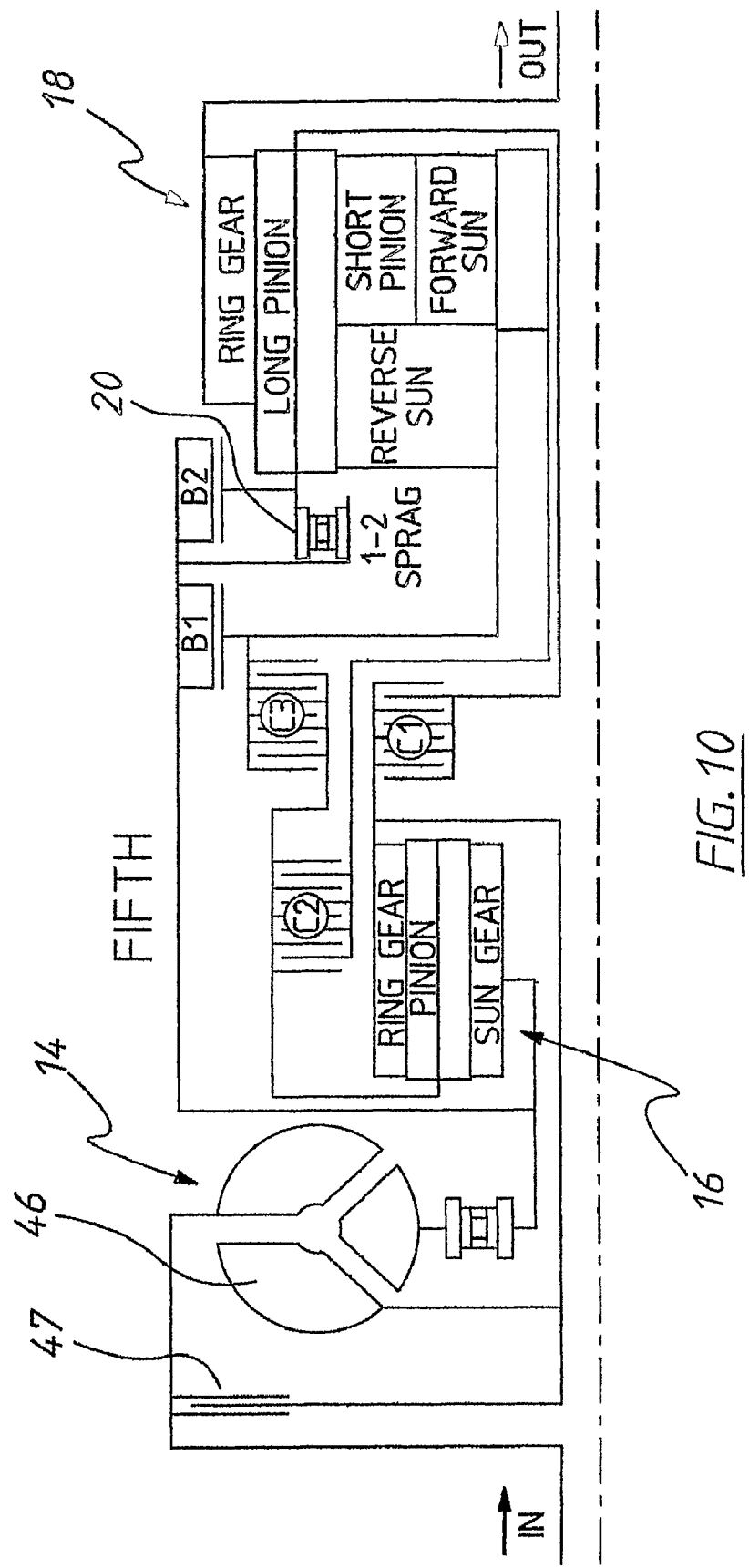
FIG. 10 is a power flow diagram of the transmission of FIGS. 1 and 2, showing power flow in a fifth gear state of the transmission.

Power flow for fifth gear is shown diagrammatically in FIG. 10.

Fifth gear is obtained by having two inputs to the rear gearset 18. One input is from the front reduction gearset 16, and the other is directly from the input shaft 48 (via clutch C1). The C1 clutch links the carrier assembly 82 of the rear gearset 18 to the input shaft 48 while the reverse sun gear 114 is driven from the output of the front gearset 16 through the C3 clutch. Mechanical lockup is provided through the lockup clutch in the torque converter 14.

Hydraulically, the 4-5 shift is effected in the same way as the 3-4 shift except that the C2 circuit is ramped off while the C3 circuit is ramped on.

7. Sixth Gear

Figure 11:
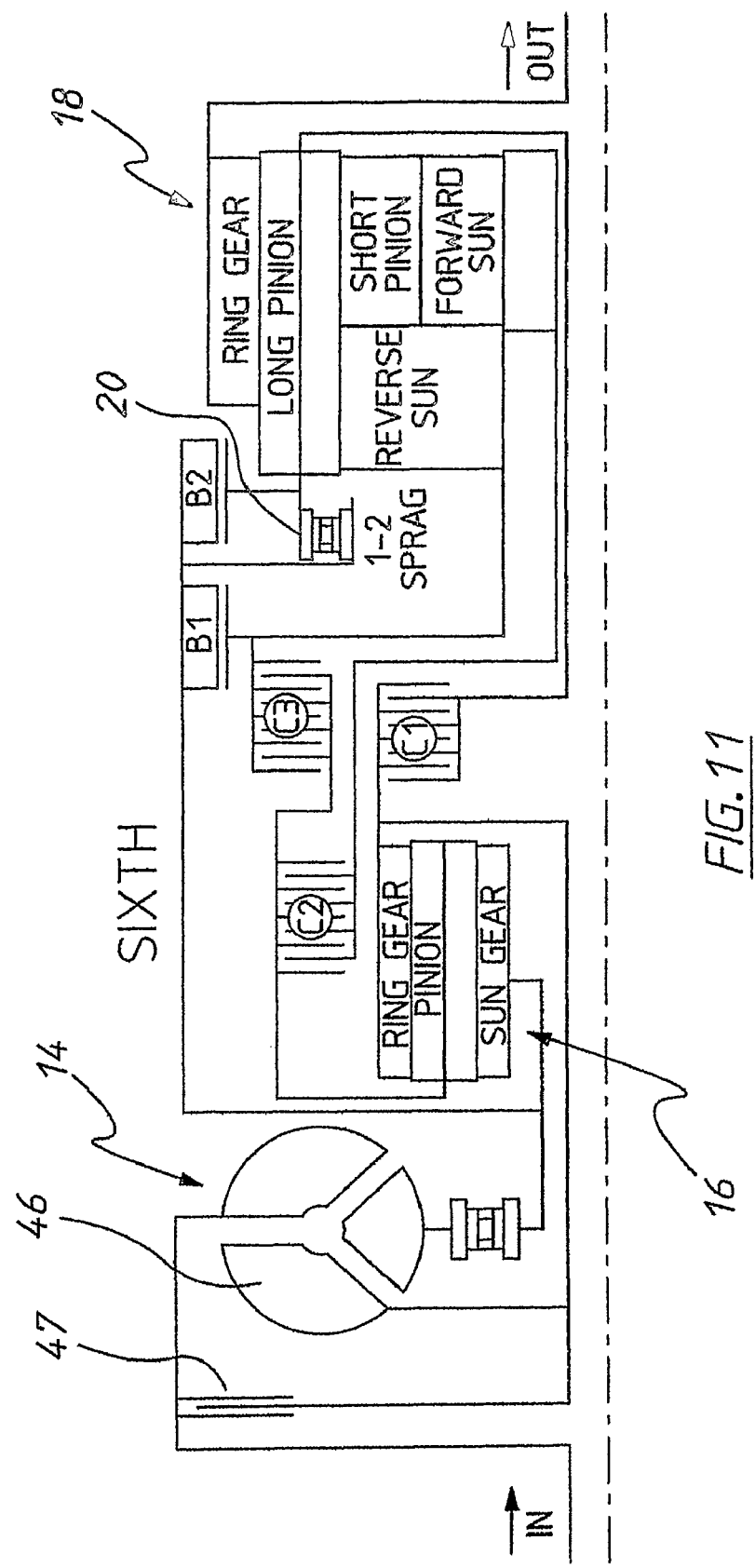
FIG. 11 is a power flow diagram of the transmission of FIGS. 1 and 2, showing power flow in a sixth gear state of the transmission.
Figure 12:
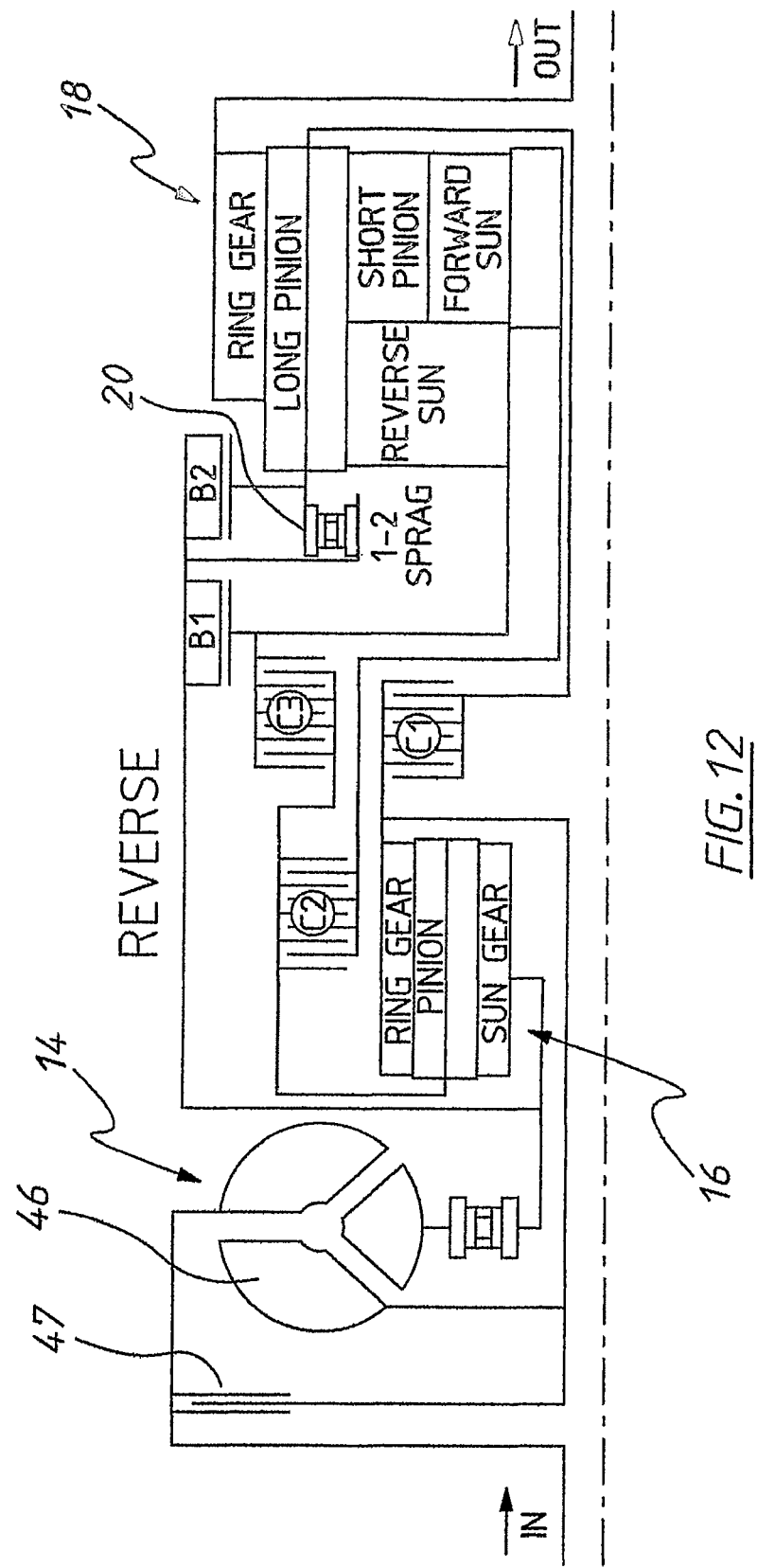
FIG. 12 is a power flow diagram of the transmission of FIGS. 1 and 2, showing power flow in a reverse gear state of the transmission.

Power flow for sixth gear is shown diagrammatically in FIG. 11.

Sixth gear is obtained by locking the reverse sun gear 114 to the transmission casing 12 using the B1 brake band and then driving directly into the rear gearset carrier assembly 82 from the input shaft 48 with the C1 clutch. Mechanical lockup is provided through the lockup clutch 47 in the torque converter 14.

Hydraulically, the 5-6 shift is effected in the same way as the 4-5 shift except that the C3 circuit is ramped off while the B1 circuit is ramped on.

8. Reverse Gear

Reverse is obtained by driving through the front gearset 16 through the C3 clutch and by locking the rear gearset carrier assembly 82 to the transmission casing 12 using the B2 brake band. Mechanical lockup is not provided through the lockup clutch 47 in the torque converter and is hydraulically prevented via the electro-hydraulic control circuit. Hydraulically, reverse is engaged by the operator first moving the T-Bar or Column Shift or other gear direction command mechanism into the reverse position. This then causes the manual valve 40 in the transmission 10 to move into the reverse position; this movement can be executed using a lever, cable, actuator or solenoid. Once in the reverse position, the manual valve 40 allows oil to flow to the relevant reverse circuits of the valve body and pump cover thus energising the clutch and brake band shift valves with hydraulic pressure. The B2 brake band is energised substantially immediately as the reverse position is selected on the manual valve 40. Its apply rate can be controlled using line pressure, but the bias valve 349 used for drive applications is bypassed in the reverse gear. Once the B2 brake band is on, clutch C3 is engaged by electro-hydraulically commanding the C3 shift valve 350 to toggle (using an O/I 348, VBS, PWM or similar) into a position where it allows oil pressure and flow to pass through it into the feed to the regulator valve circuit (i.e. to C3 regulator valve 354). At the same time, oil is fed to the regulator valve pressure control solenoid (which can be a PWM, VFS, VPS, VBS 352 or similar). The clutch engagement can be now be executed by electro-hydraulically ramping the C3 clutch on using the regulator valve 354 in combination with the pressure control solenoid 352. Thus, the shift feel of the N-R shift can be controlled by the electronic controller and can be tailored/calibrated to suit a variety of vehicle conditions and driver inputs. Abuse protection is also effected by de-energising the clutch to protect the driveline if the abuse protection software algorithm has been initiated. By only feeding oil to the individual pressure control solenoids when the shift valves are actuated allows the leakage associated with these types of solenoids to be limited to conditions only where the solenoid needs to be used. When the solenoid 352 is not required, oil is not fed to it and hence no leakage is demanded from the hydraulic circuit and the pump size can then be optimised resulting in maximum fuel economy benefits. As an alternative control method for the engagement of the C3 clutch, the clutch regulator valve 354 can be set to maximum pressure during the N-R process. This would normally result in a harsh shift shock, however, to alleviate this, the line pressure control solenoid 274 can be used to ramp the line pressure or source oil on slowly, thus resulting in a smoother engagement.

9. Neutral

The neutral condition of the transmission 10 is achieved by disengaging all three clutches C1, C2 and C3, and also by disengaging brake bands B1 and B2. Accordingly, the neutral condition is an unbraked neutral wherein the input and the output of the transmission are free to rotate relative to the housing of the transmission.

Manufacture

The 6 forward ratio transmission was developed so that it could be manufactured using an existing production line already used for manufacturing 4 forward ratio transmissions, and is able to be manufactured on the same production line and at the same time as 4 forward ratio transmissions. Over 70% of the original 4 forward ratio transmission parts and tooling are also used for the 6 forward ratio transmission.

The design of the existing 4 forward ratio automatic transmission was converted to suit the 6 forward ratio transmission by removing a friction element from the design of the 4 forward ratio transmission, providing a planetary gearset in place of the removed friction element, and providing a control system to operate remaining friction elements independently of one another.

The 6 forward ratio automatic transmission is configured such that mechanical hardware (including the additional planetary gearset) is able to be omitted in order to provide an automatic transmission having 4 forward ratios.

Features

The transmission 10 of the example described above features the following:

A single input shaft driving the transmission;

A full neutral function in neutral (unbraked neutral);

The use of 3 clutches, 2 brake bands and 1 one way clutch to achieve 6 gears;

The use of 17 valves to achieve total electro-hydraulic control of the transmission;

The inclusion of a lockup clutch in the torque converter;

The ability to achieve first gear with the engagement of only one friction element;

Individual controllability of all friction clutches and brake bands from zero pressure to maximum pressure using individual solenoid combinations;

The use of non-linked friction elements (i.e. no common pressure or hydraulic areas between elements);

The use of an input shaft speed sensor for control decisions;

The use of a quadrature output speed sensor for control decisions;

The use of an analogue front brake band pushrod position sensor for control decisions;

The use of direct clutch and brake band controls to enable abuse protection of the vehicle driveline;

The use of direct clutch and brake band controls to enable smooth engagement of forward and reverse gear conditions from neutral using electro-hydraulic control;

Packaging to enable the 6 forward ratio transmission hardware to fit within the original package space confines of a 4 forward ratio transmission;

Mechanical hook-up that allows a 4 forward ratio transmission to be built by omitting mechanical hardware, still using the 6 forward ratio control system;

Mechanical hook-up that allows the 6 forward ratio transmission to be built using existing manufacturing tooling and facilities;

The use of combined closed loop and adaptive control strategies to ensure smooth gearshift control;

The use of a pressure differential electro-hydraulic controls for the lockup clutch in the torque converter that enables the use of slip control strategy to achieve lower locked engine speeds and to reduce NVH (Noise Vibration Harshness) in 2nd, 3rd, 4th, 5th and 6th gears;

The use of a full range variable line pressure control that is independent of other transmission functions;

A hydraulic control system that still allows for "limp-home" function of Park, Reverse, Neutral and Drive 4th gears in the event of electronic failure;

A hydraulic control system that hydraulically prevents torque converter lockup from occurring in Park, Neutral, Drive first and Reverse gears;

A hydraulic control system having a cooler bypass circuit that protects the transmission from cooler blockage or freezing;

The use of a fixed displacement pump;

The use of a quick-apply feature in the front brake band piston assembly;

The use of line priority pressure feed from the pump supply;

The use of a combination of On/Off solenoids, Variable Bleed Solenoids, Shift Valves and Pressure Regulator Valves to achieve electro-hydraulic clutch and brake band controls; and Valve arrangement that disconnects the solenoids and minimises solenoid leakages when the solenoids are not required.

Many modifications and variations may be made to the transmission 10 described above without departing from the spirit and scope of the invention.

The invention claimed is:

1. A torque converter for selectively providing a mechanical connection between a drive unit and a drive train, the torque converter comprising:
   a lockup clutch or a coupling device having a driving part connected to the drive unit and a driven part connected to the drive train;
   a control system for applying an apply pressure in a sense to cause frictional engagement between the driving part and the driven part and applying a release pressure in a sense to cause disengagement of the driving part and the driven part, wherein a differential between the apply and release pressures is progressively controllable by the control system so as to control the relative positioning between the driven part and the driving part;
   a valve for balancing the apply and release pressures, the valve receiving a first input hydraulic fluid and a second input hydraulic fluid;
   a first pressure regulator for regulating the pressure of the first input hydraulic fluid; and
   a second pressure regulator for regulating the pressure of the second input hydraulic fluid.

2. A torque converter as claimed in claim 1, wherein each of the pressure regulators has a feedback arrangement whereby the output of the regulator is fed back to the regulator.

3. A transmission having a torque converter as claimed in claim 1.

4. A torque converter as claimed in claim 1, wherein the coupling device includes any one of: a wet starting clutch; a friction launch device; or a fluid coupling.

5. A torque converter as claimed in claim 1, wherein the control system of the lockup clutch provides progressive control of release of pressure from the lockup clutch or coupling device.

6. A torque converter comprising:
   a lockup clutch or a coupling device having a driving part and a driven part engageable in response to an apply pressure and disengageable in response to a release pressure;
   a control system for controlling application of the apply and release pressures and progressively controlling a pressure differential between the apply and release pressures so as to control the relative positioning between the driven part and the driving part;
   a valve for balancing the apply and release pressures, the valve receiving a first input hydraulic fluid and a second input hydraulic fluid;
   a first pressure regulator for regulating the pressure of the first input hydraulic fluid; and
   a second pressure regulator for regulating the pressure of the second input hydraulic fluid.

7. A torque converter as claimed in claim 6, wherein the coupling device includes any one of: a wet starting clutch; a friction launch device; or a fluid coupling.

8. A torque converter as claimed in claim 6, wherein the control system of the lockup clutch provides progressive control of release of pressure from the lockup clutch or coupling device.

9. A torque converter as claimed in claim 8, wherein the control system provides progressive control of release of the release pressure from the lockup clutch or coupling device.

10. A torque converter as claimed in claim 8, wherein each of the apply pressure and the release pressure is progressively controllable.

11. A torque converter as claimed in claim 6, wherein the driven part is a clutch plate and the driving part is a surface for engagement with the dutch plate.

12. A torque converter as claimed in claim 11, wherein the apply pressure is balanced with the release pressure to control positioning of the clutch plate relative to the surface.

13. A torque converter as claimed in claim 6, wherein the apply pressure is provided by hydraulic fluid in a first line communicating with the lockup clutch or coupling device and the release pressure is provided by hydraulic fluid in a second line communicating with the lockup clutch or coupling device.

14. A torque converter as claimed in claim 13, wherein the valve receives feedback pressure from each of the first and second lines.

15. A torque converter as claimed in claim 14, wherein each of the first and second lines has a feedback line which is restricted so as to provide a desired proportion of the pressure in the line as feedback to the valve.

16. A torque converter as claimed in claim 15, wherein the valve has a spring for biasing the valve to a configuration whereby the lockup clutch or coupling device is disengaged.

17. A torque converter as claimed in claim 16, wherein operation of the valve is controlled by a variable bleed solenoid.

18. A transmission having a torque converter as claimed in claim 6.

19. A method of controlling engagement/disengagement of a lockup clutch of a torque converter or coupling device including the steps of:
providing an apply pressure in a sense to cause frictional engagement between a driving part and a driven part of the lockup clutch or coupling device;
providing a release pressure to cause disengagement of the driving part and the driven part; and
progressively controlling a differential between the pressures so as to control the relative positioning between the driven part and the driving part;
providing a valve for balancing the apply and release pressures, the valve receiving a first input hydraulic fluid and a second input hydraulic fluid;
regulating the pressure of the first input hydraulic fluid; and
regulating the pressure of the second input hydraulic fluid.

20. A method as claimed in claim 19, wherein the coupling device includes any one of: a wet starting clutch; a friction launch device; or a fluid coupling.

* * * * *